United States Patent [19]

Tsuchiya et al.

[11] Patent Number: 4,551,768

[45] Date of Patent: Nov. 5, 1985

[54] METHOD AND APPARATUS FOR PROCESSING IMAGE SIGNAL

[75] Inventors: Hiroyoshi Tsuchiya, Kanagawa; Katsuo Nakazato, Tokyo; Kunio Sannomiya, Kanagawa; Hidehiko Kawakami, Tokyo; Hirotaka Otsuka, Kanagawa, all of Japan

[73] Assignee: Matsushita Electric Industrial Co., Ltd., Osaka, Japan

[21] Appl. No.: 545,926

[22] Filed: Oct. 27, 1983

[30] Foreign Application Priority Data

Oct. 27, 1982 [JP] Japan .................................. 57-188401
Jul. 28, 1983 [JP] Japan .................................. 58-138016
Jul. 28, 1983 [JP] Japan .................................. 58-138017

[51] Int. Cl.$^4$ ............................................. H04N 1/40
[52] U.S. Cl. .................................... 358/283; 358/280; 358/284; 382/54; 382/56
[58] Field of Search .................. 358/280, 283, 284; 382/56, 54

[56] References Cited

U.S. PATENT DOCUMENTS 4,298,895 11/1981 Arai et al. ............................ 358/284
4,449,150 5/1984 Kato ..................................... 358/283

Primary Examiner—Howard W. Britton
Assistant Examiner—John K. Peng
Attorney, Agent, or Firm—Burgess, Ryan & Wayne

[57] ABSTRACT

The invention relates to a method for processing an image signal such that areas of original image data are sequentially scanned with a scanning window having a size corresponding to M picture elements in units of a predetermined number of picture elements so as to perform halftone display in accordance with black-and-white binary distribution with respect to the signal levels of the picture elements within the scanning window every time the scanning window is moved. The picture elements within the scanning window are assigned an order of preference in accordance with their image signal levels. A sum of the image signal levels of the picture elements within the scanning window is calculated, and A and N of the equation $S = C \times N + A$ are calculated, where C is a predetermined image signal level (e.g., black level and maximum level), N is an integer, and A is the image signal level falling within the range $0 \leq A < C$. As a result of the preference operation, N picture elements are assigned a level C, the next picture element is assigned a level A, and the remaining picture elements, 0. In order to impart regularity to the converted image signal distribution, additional data is added to the preference data.

13 Claims, 25 Drawing Figures

| O | O |
|---|---|
| C | A |

| $D_{m-1,n-1}$ | $D_{m-1,n}$ |
|---|---|
| $D_{m,n-1}$ | $D_{m,n}$ |

| $D'''_{m-1,n-1}$ | $D''_{m-1,n}$ |
|---|---|
| $D'_{m,n-1}$ | $D_{m,n}$ |

| $D''''_{m-1,n-1}$ | $D'''_{m-1,n}$ |
|---|---|
| $D''_{m,n-1}$ | $D'_{m,n}$ |

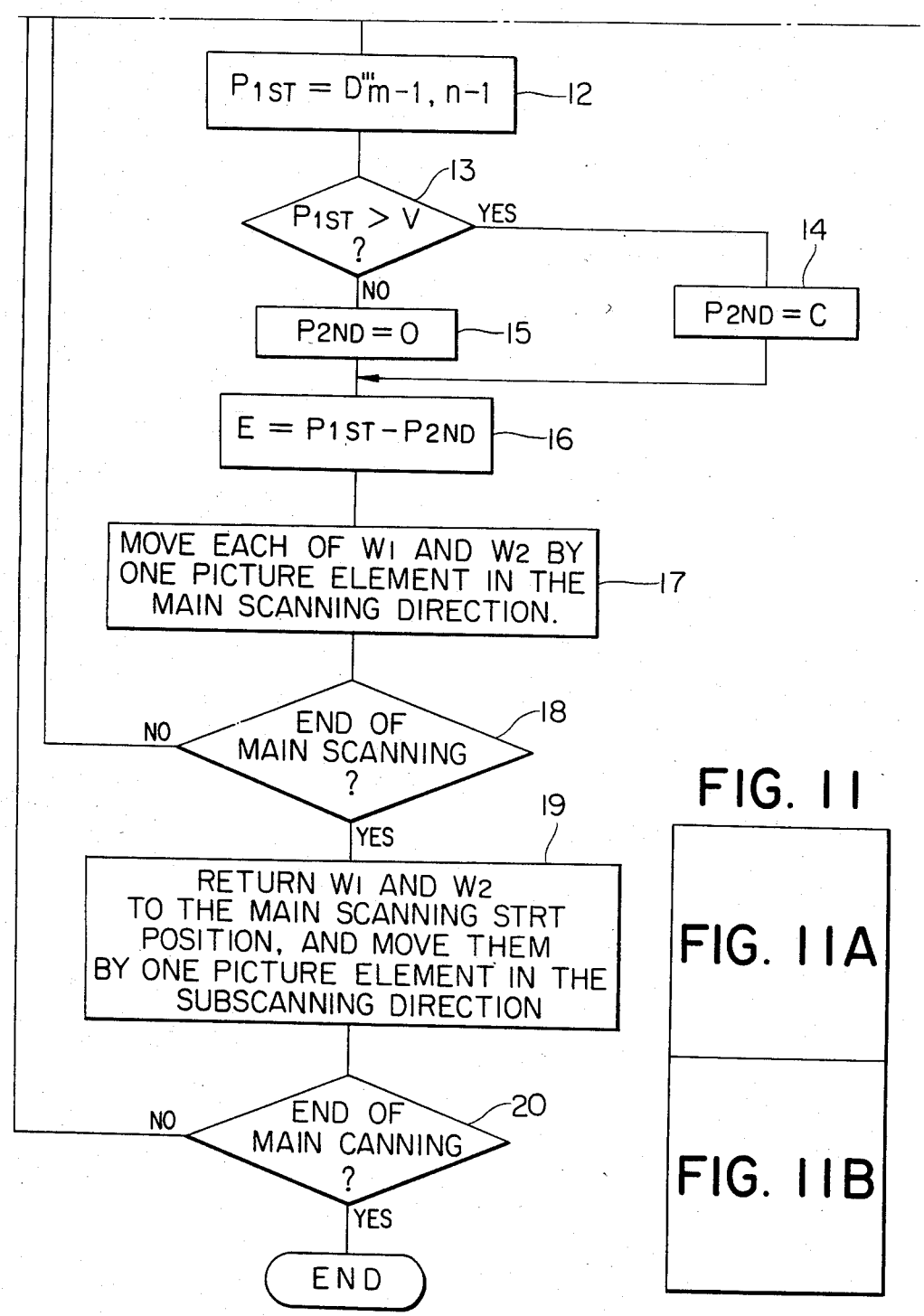

METHOD AND APPARATUS FOR PROCESSING IMAGE SIGNAL

BACKGROUND OF THE INVENTION

1. Field of the Invention

The present invention relates to a method and apparatus for processing an image signal and, more particularly, to a method and apparatus which are used in a general image scanning/recording apparatus (e.g., facsimile system) or image scanning/display apparatus for scanning an image or picture by dividing it into segments and reconstructing an image of the original.

2. Description of the Prior Art

Recently, facsimile systems have become frequently used in daily business. There arises a demand for halftone reproduction of pictorial images in addition to black-and-white binary reproduction of documents or the like. However, halftone reproduction often has many restrictions from the viewpoints of recording apparatuses and transmission systems. For example, an apparatus for recording an image on a silver chloride film used in conventional photography or a heat-sensitive printing apparatus has good recording characteristics for halftone recording. However, an electrostatic copying machine or an ink jet printing apparatus has good characteristics for binary recording. On the other hand, regarding transmission systems, digital data transmission is taking over from analog data transmission. In this field, data compression schemes are used to perform high-speed data transmission. Under these conditions, a pseudo halftone display system having a binary recording apparatus is proposed, which is suitable for digital data transmission, thereby providing an optimum facsimile system.

An electronic halftone-dot generating method for a printed image in a newspaper or magazine and a dither method for digitizing or quantizing an image signal in accordance with a threshold matrix table are typical examples of a pseudo halftone display system. However, these conventional methods have poor resolution of a two-valued (binary) image such as a character or line. Therefore, the halftone portion or binary image portion cannot help but be sacrificed.

For example, according to the dither method, in a threshold window consisting of a threshold pattern of a plurality of different threshold levels, a multilevel input image signal is compared with the threshold levels in units of picture elements. When a given picture element level of the original image data exceeds the corresponding threshold, the picture element is set to "black". Otherwise, the picture element is set to "white". In this manner, each picture element is converted to binary data. When a 4×4 matrix window is used, 16 threshold levels can be set. Therefore, halftone display having 17 levels can be performed for the original image data. In this manner, according to the conventional dither method, black elements appear in each threshold window in a number corresponding to the original image data levels, so as to represent an average halftone mode. When the window size is small, the displayed image has good resolution. In this case, however, the number of halftone levels is decreased. On the other hand, if the window size is large, the number of halftone levels is increased. However, in this case, resolution is degraded. In addition to this disadvantage, the quality of a reproduced image of a binary original image portion is degraded in accordance with the conventional dither method, as compared with general binary processing.

SUMMARY OF THE INVENTION

It is, therefore, an object of the present invention to provide a method and apparatus for processing an image signal so as to provide a displayed/recorded image of good image quality for both a binary image and a halftone image.

According to a method of the present invention for processing an image signal, a scanning window for scanning M picture elements is moved along an original image data area by every predetermined number of picture elements so as to scan the entire image by setting signal levels of the picture elements within the scanning window in accordance with black-and-white binary distribution, thereby displaying a halftone image. The picture elements within the scanning window are assigned a predetermined order of preference in accordance with their image signal levels. A sum S of the image signal levels of all the picture elements within the scanning window is calculated, and values of N and A which satisfy an equation $S = C \times N + A$ are calculated, where C is a predetermined image signal level (e.g., black level or maximum level), N is an integer, and A is a signal level which is lower than the image signal level C and which is equal to or higher than a level 0 (e.g., white level). The integer N is the quotient and A is the remainder when the sum S is divided by the image signal level C. N picture elements are set at C as the image signal level, the next one picture element is set at A as the image signal level, and the remaining picture elements are set at 0 as the image signal level. The main feature of the present invention is to add (superpose) additional data for giving regularity to (on) the preference original image data. This regularity deemphasizes an edge emphasis and provides good display of a converted halftone image corresponding to a uniform density distribution of the original image.

In order to substantially compensate a non linearity of the blackish portion of the original image data, it is preferred that the original image data level is corrected (e.g., by correction of the additional data level) in accordance with the sum S. The correction coefficients for the additional data in practice comprise five step coefficients corresponding to levels of the sum S.

The image signal levels of picture elements within the scanning window are assigned to be C, A or 0, and the image is converted. Furthermore, the picture element levels are produced as binary data. In this case, a slight error occurs between the density of the original image and that of the converted image. The present invention has another main feature having steps of and means for correcting this error.

The present invention has the following aspects which include the above-mentioned features.

According to an aspect of the present invention, there is provided a method for processing an image signal, comprising:

a first step of storing in image signal memory means image signal levels of picture elements which are obtained by scanning an original image in a divided manner;

a second step of producing data obtained by adding to the image signal levels additional data which imparts regularity to image signals to be displayed;

a third step of obtaining a sum S of the image signal levels of all the picture elements within a scanning window which has a size corresponding to M picture elements and which scans said image signal memory means, and obtaining values of N and A which satisfy an equation $S=C\times N+A$ for $0\leq A<C$, where C is a predetermined image signal level, N is an integer, and A is a remainder;

a fourth step of numbering the image signal levels in accordance with one of ascending and descending orders so as to assign an order of preference to all the picture elements within the scanning window in accordance with sum data obtained in the third step;

a fifth step of assigning C as an image signal level to N picture elements in one of the ascending and descending orders, A as an image signal level to a next picture element, and 0 as an image signal level to remaining picture elements; and a sixth step of moving the scanning window by a predetermined number of picture elements so as to correspond to memory locations of said image signal memory means.

According to another aspect of the present invention, there is provided a method for processing an image signal, comprising:

a first step of storing in first and second image signal memory means image signal levels of picture elements which are obtained by scanning an original image in a divided manner;

a second step of calculating a sum S of error correction data E and a sum $S_m$ of the image signal levels of all picture elements within a first scanning window which has a size corresponding to M picture elements and which scans said first image signal memory means, and obtaining N and A from equations given below:

$$S = C\times N+A \text{ for } 0\leq S\leq C\times M$$

$$N=0, A=0 \text{ for } 0>S$$

$$N=M, A=0 \text{ for } S>C\times M$$

where C is a predetermined image signal level, N is an integer falling in a range $0\leq N\leq M$, and A is an image signal level falling in a range $0\leq A<C$;

a third step of superposing values adjusted according to sums on all picture elements within a second scanning window which has a size corresponding to M picture elements, and numbering the superposed picture elements in accordance with one of descending and ascending orders of the image signal levels, the sums being obtained by adding parts of the image signal levels of all the picture elements within the first scanning window to additional data, and the second scanning window being used to scan memory positions of said second image signal memory means which correspond to those of said first image signal memory means;

a fourth step of assigning C as an image signal level to N picture elements within the first scanning window in accordance with one of the ascending and descending orders of the image signal levels, A as an image signal level to a next picture element, and 0 as an image signal level to remaining picture elements;

a fifth step of comparing an image signal level $P_{1ST}$ with a predetermined quantizing level V for $0\leq V<C$, and for assigning C to the image signal level $P_{1ST}$ when the image signal level $P_{1ST}$ is greater than the quantizing level V and assigning 0 to the image signal level $P_{1ST}$ when the image signal level $P_{1ST}$ is smaller than the quantizing level V, an assigned level being defined as an image signal level $P_{2ND}$, and the image signal level $P_{1ST}$ being defined as a picture element which will not appear within the first scanning window again upon movement of the first scanning window along a main scanning direction;

a sixth step of giving, as the error correction data E after main scanning, a sum of differences between image signal levels $P_{1ST}$ and $P_{2ND}$; and a seventh step of repeating the first to sixth steps by moving the first and second scanning windows by predetermined numbers of picture elements over the entire areas of said first and second image signal memory means, respectively.

According to still another aspect of the present invention, there is provided an apparatus for processing an image signal, comprising:

first image signal memory means for storing image signal levels of picture elements which are obtained by scanning an original image in a divided manner;

additional data adding means for adding additional data to the image signal levels of the picture elements;

second image signal memory means for storing data for producing data for assigning an order of preference to all picture elements within a scanning window;

data adding means for obtaining a sum S of all picture elements within a first scanning window which has a size corresponding to M picture elements so as to scan said first image signal memory means;

means for obtaining values of N and A which satisfy an equation $S=C\times N+A$ where C is a predetermined image signal level, N is an integer and A is an image signal level which satisfies $0\leq A<C$;

preference circuit means for numbering all picture elements within a second scanning window which has a size corresponding to M picture elements so as to scan said second image signal memory means, in accordance with one of ascending and descending orders of the image signal levels;

rearrangement circuit means for assigning C as an image signal level to N picture elements of the picture elements ordered by said preference circuit, A as an image signal level to a next picture element, and 0 as an image signal level to remaining picture elements; and means for moving the first and second scanning windows by predetermined numbers of picture elements over entire areas of said first and second image signal memory means, respectively.

According to still another aspect of the present invention, there is provided an apparatus for processing an image signal, comprising:

first and second image signal memory means for storing image signal levels of picture elements which are obtained by scanning an original image in a divided manner;

means for calculating a sum S of error correction data E and a sum $S_m$ of the image signal levels of all picture elements within a first scanning window which has a size corresponding to M picture elements and which scans said first image signal memory means, and obtaining N and A from equations given below:

$$S=C\times N+A \text{ for } 0\leq S\leq C\times M$$

$$N=0, A=0 \text{ for } 0>S$$

$$N=M, A=0 \text{ for } S>C\times M$$

where C is a predetermined image signal level, N is an integer falling in a range $0 \leq N \leq M$, signal level falling in a range $0 \leq A < C$;

preference circuit means for superposing values adjusted according to sums on all picture elements within a second scanning window which has a size corresponding to M picture elements, and numbering the superposed picture elements in accordance with one of descending and ascending orders of the image signal levels, the sums being obtained by adding parts of the image signal levels of all the picture elements within the first scanning window to additional data, and the second scanning window being used to scan memory positions of said second image signal memory means which correspond to those of said first image signal memory means;

means for assigning C as an image signal level to N picture elements in accordance with one of the ascending and descending orders given by said preference circuit means, A as an image signal level to a next picture element, and 0 as an image signal level to remaining picture elements;

means for comparing an image signal level $P_{1ST}$ with a predetermined quantizing level V for $0 \leq V < C$, and for assigning C to the image signal level $P_{1ST}$ when the image signal level $P_{1ST}$ is greater than the quantizing level V and assigning 0 to the image signal level $P_{1ST}$ when the image signal level $P_{1ST}$ is smaller than the quantizing level V, an assigned level being defined as an image signal level $P_{2ND}$, and the image signal level $P_{1ST}$ being defined as a picture element which will not appear within the first scanning window again upon movement of the first scanning window along a main scanning direction;

means for giving, as the error correction data E after main scanning, a sum of differences between image signal levels $P_{1ST}$ and $P_{2ND}$; and means for moving the first and second scanning windows by predetermined numbers of picture elements over the entire areas of said first and second image signal memory means, respectively.

BRIEF DESCRIPTION OF THE DRAWINGS

FIGS. 11, 11A and 11B are flow charts for explaining a processing method according to a second embodiment of the present invention;

DETAILED DESCRIPTION OF THE PREFERRED EMBODIMENTS

Preferred embodiments of the present invention will be described with reference to the accompanying drawings.

Figures 1, 2A, 2B, 2C, 2D:
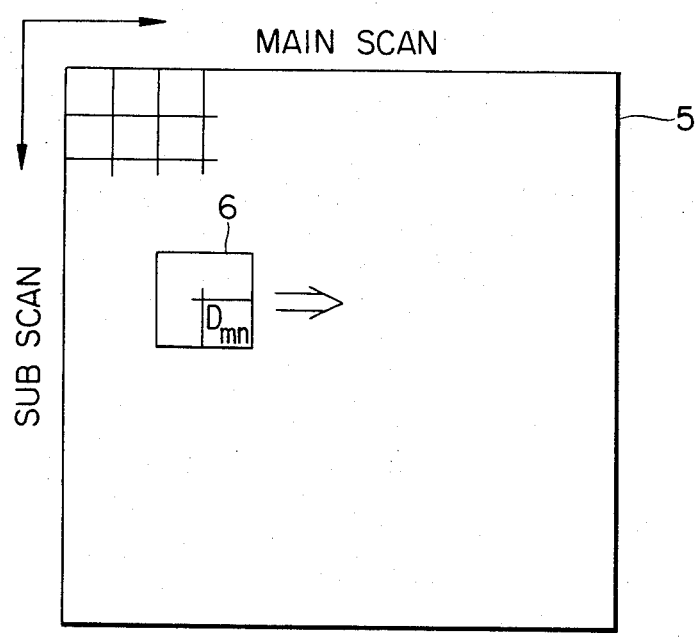
FIG. 1 is a representation for explaining a scanning window of the present invention.
FIGS. 2A to 2D, respectively, are representations for explaining data conversion according to the present invention.

FIG. 1 is a representation for explaining window scanning and data conversion. Reference numeral 5 denotes original image data. A scanning window 6 is moved to the right (main scanning direction) and in the downward direction (subscanning direction) so as to sequentially convert image data to image signals (i.e., scan the original image data 5). The size of the scanning window 6 can be arbitrarily selected. For example, the scanning window 6 generally has a size of $2 \times 2$ picture elements, $3 \times 3$ picture elements or $4 \times 4$ picture elements. The scanning window 6 basically scans every picture element along the main scanning and subscanning directions. Although the scanning window 6 need not scan every picture element, every picture element is scanned in this embodiment. When the scanning window 6 has a size of $2 \times 2$ picture elements, each picture element of the original image data 5 is subjected to data conversion four times upon movement of the scanning window. The data conversion is performed in the following manner. FIG. 2B shows original image data corresponding to the current position of the scanning window 6. FIG. 2C shows the state before data conversion is performed at the current scanning window position. The number of "'" marks indicate the previous number of data conversion steps. FIG. 2D shows the state obtained after the picture element was converted at the current scanning window position. It is assumed that the converted data is obtained not by updating the original image data but by storing the corresponding data in a separate memory. The data conversion within the scanning window 6 is performed in the following steps:

Step 1. A sum S of values of data shown in FIG. 2C is obtained as follows:

$$S = D'''_{m-1,n-1} + D''_{m-1,n} + D'_{m,n-1} + D_{m,n}$$

Step 2. N and A in the following equation are obtained:

$$S = C \times N + A$$

where C is a constant (e.g., $C = D_{max}$) and N is a positive integer.

Step 3. The values of the original data shown in FIG. 2B are checked. When the same values are present, these are ordered in accordance with the predetermined order of preference.

Step 4. N picture elements of data (FIG. 2C) which correspond to those of the original image data (FIG. 2B) are converted to the constant C, the next picture element is converted to A, and the remaining picture elements are converted to 0.

For example, when $N = 1$ is given in step 2, and the relation $D_{m,n-1} > D_{m,n} > D_{m-1,n} > D_{m-1,n-1}$ is given in step 3, the original image data is converted in a manner as shown in FIG. 2A.

When the above data conversion is performed for all the data of the original image, portions of the original image data 5 which have smaller values are mostly converted to 0. However, portions of the original image data 5 which have larger values are mostly converted to C. In this manner, the picture elements are converted in proportion to the values of the original image data 5. Therefore, when the converted values are compared with the thresholds in the same manner as in the conventional method so as to obtain binary data, pseudo halftone display data can be obtained. The above data processing has advantages in that the resolution of the reproduced image with respect to the white-black binary original image will not be degraded since the converted data values are rearranged in accordance with the order from the larger original data values, and in that a thin solid line of the original image or picture can be reproduced as a solid line unlike in the conventional method where a thin solid line is reproduced as a dotted line due to quantization. This is because a large original image data value is enhanced by the additional smaller original image data near such large original image value.

However, in the halftone image subjected to the above data processing, the contrast between the larger value and the smaller value is emphasized due to the above-mentioned enhancing effect, so that the edge of the corresponding image portion tends to be emphasized. In addition to this disadvantage, an image portion having a uniform data distribution results in an irregular density distribution of a reproduced image.

In order to eliminate these drawbacks, special measures are implemented to obtain converted data having a uniform density distribution and to cancel undesired edge emphasis in the following manner.

In the above data processing, the original data values within the scanning window of FIG. 2B are arranged in accordance with an order of the larger values. When regularity is imparted to the preference data, the converted data has a regular distribution.

Figures 4A, 4B:
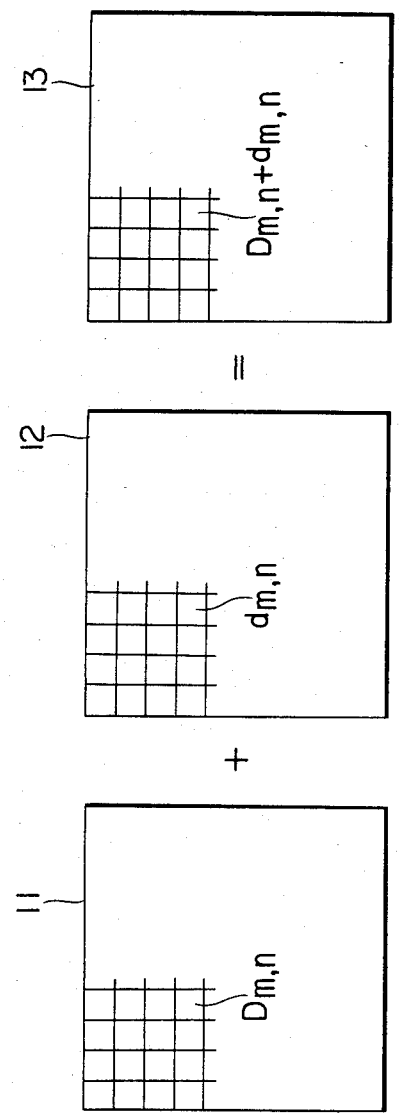
FIGS. 4A and 4B, respectively, are representations for explaining a method for imparting regularity during data rearrangement according to a first embodiment of the present invention.

FIG. 4A shows a case wherein regularity is imparted to the converted data. Reference numeral 11 denotes original image data; 12, additional data to be added to the original data 11; 13, data obtained by adding the additional data 12 to the original image data 11. A step for using the data 13 in FIG. 4A as preference data instead of the original image data is different from the sequence of steps 1 to 4 described above. The data in step 1 does not contain the additional data component. The additional data 12 shown in FIG. 4A has a regular array pattern and can be arbitrarily arranged. For example, a 4×4 matrix pattern is used to prepare the additional data 12. In this example, the additional data 12 are preset to have values smaller than 1/10 of the maximum value of the original image data 11. When the values of the additional data 12 are too large, the edge of the original image data is excessively deemphasized.

In this embodiment, the additional data 12 in FIG. 4A has a regular array pattern. However, the additional data 12 can have any pattern, so that a separate image pattern may be prepared to arrange the preference data pattern for a special effect.

The image processing steps described above can be summarized as follows:

Step 1. A series image signal obtained by scanning the divided portions of the original image along the main scanning and subscanning directions is stored in an image signal memory $G_1$.

Step 2. Sum data obtained by adding the separately prepared additional data to the data in the image signal memory $G_1$ are stored in memory locations of an image signal memory $G_2$ which correspond to those of the image signal memory $G_1$.

Step 3. N and A are obtained for image signal levels $L_{i+u,j+v}$ (u+0 to m and v+0 to n) of picture elements $P_{i+u,j+v}$ within a scanning window $W_{i,j}$ having a size of $(m+1) \times (n+1)$ so as to scan the image signal memory $G_1$ in the following manner:

$$\sum_{v=0}^{n} \sum_{u=0}^{m} L_{i+u,j+v} = C \times N + A$$

where C is the output signal maximum value, N is an integer, and A is a remainder falling within the range $0 \leq A < C$.

Step 4. A descending value of an image signal level $L'_{i+u,j+v}$ of picture elements $P'_{i+u,j+v}$ within a scanning window $W'_{i,j}$ for scanning a portion of the image signal memory $G_2$ which corresponds to that of the image signal memory $G_1$ is given as $K(P_{i+u,j+v})$.

Step 5. By using the descending value $K(P_{i+u,j+v})$, the picture elements $P_{i+u,j+v}$ within the scanning window $W_{i,j}$ are converted as follows:

$$L_{i+u,j+v} = C \text{ for } K(P_{i+u,j+v}) \leq N$$

$$L_{i+u,j+v} = A \text{ for } K(P_{i+u,j+v}) = N+1$$

$$L_{i+u,j+v} = 0 \text{ for } K(P_{i+u,j+v}) > N+1$$

Step 6. Steps 3 to 6 are repeated for all elements j (from 1 to the end) along the main scanning direction.

Step 7. Steps 3 to 6 are repeated for all elements i (from 1 to the end) along the subscanning direction.

In the above description, rectangular scanning windows $W'_{i,j}$ and $W_{i,j}$ are used. However, circular, elliptical or triangular scanning windows can be used as needed.

In the above case, the constant C is defined as the output signal maximum value. However, C can be defined as an input image signal maximum value or a value in the vicinity of the maximum value.

A descending value is used for conversion in steps 4 and 5. However, an ascending value can be used in place of the descending value. In the above case, the scanning period is a one-pel period along the main scanning direction or the subscanning direction. However, the scanning period and the scanning direction can be arbitrarily selected.

All the image signal arrays are stored in the image signal memories $G_1$ and $G_2$ in the above description. However, only data arrays required for the scanning windows $W_{i,j}$ and $W'_{i,j}$ can be stored in these memories and can be replaced with updated data arrays.

Figure 5:
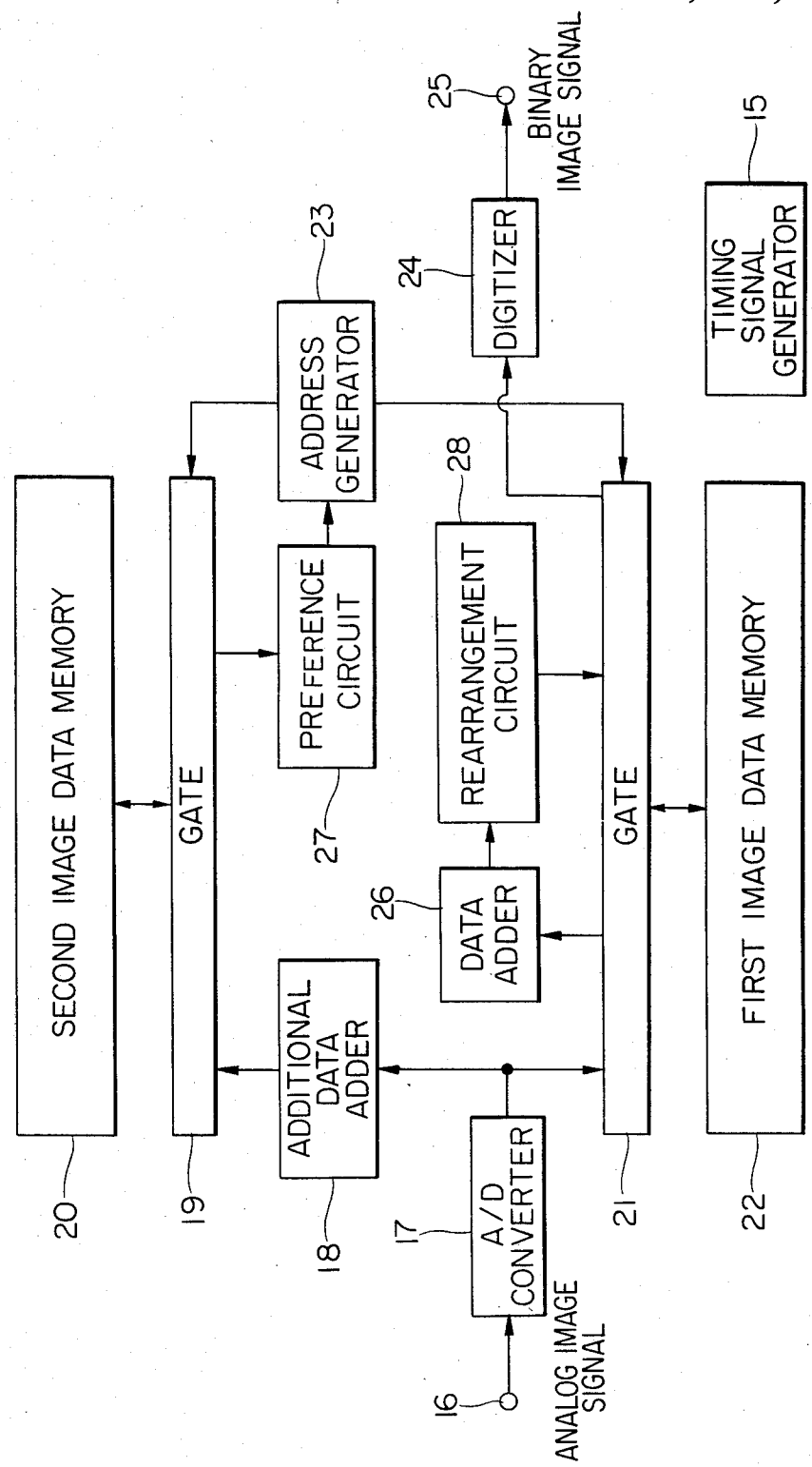
FIG. 5 is a block diagram of an image signal processing apparatus of the first embodiment to which the method shown in FIG. 4 is applied.

FIG. 5 is a block diagram of a data converter so as to explain the basic operation for realizing the first embodiment of the present invention. Reference numeral 15 denotes a timing signal generator for generating timing signals in an intrablock or interblock arrangement. Signal lines between the blocks and the timing signal generator 15 are omitted in FIG. 5. An analog image signal obtained by scanning the original image is supplied to an input terminal 16 and to an A/D converter 17. A digital image signal from the A/D converter 17 is superposed by an additional data adder 18 on a regularity pattern. The sum digital signal is stored in a second image data memory 20 through a gate 19. The digital image signal from the A/D converter 17 is stored in a first image data memory 22 through a gate 21. The gates 19 and 21 are controlled by an address generator 23. The address generator 23 accesses data write/read addresses of the first and second memories 22 and 20. The data stored in the memory 20 are used as preference data, and the data stored in the memory 22 are updated by data conversion in accordance with data rearrangement. When the data conversion for rearrangement is completed, the rearranged data are read out from the first memory 22 through the gate 21. The readout data is supplied to a digitizer 24 and appears as an output image signal to be recorded by the image recording apparatus at an output terminal 25. A data adder 26 receives data within the scanning window from the first memory 22 through the gate 21 so as to calculate a sum of scanning window position data. A preference circuit 27 receives data within the scanning window from the second memory 20 through the gate 19 and determines all data addresses of contents (of the first memory 22) corresponding to the scanning window positions. The address designation signals are then supplied from the preference circuit 27 to the address generator 23. A rearrangement circuit 28 prepares conversion data from the sum obtained by the adder 26, and sequentially writes, through the gate 21 the conversion data at the addresses of the first memory 22 which are designated by the address generator 23. The preference circuit 27, the rearrangement circuit 28 and the adder 18, as shown in FIG. 5, are described hereinafter.

Figure 6:
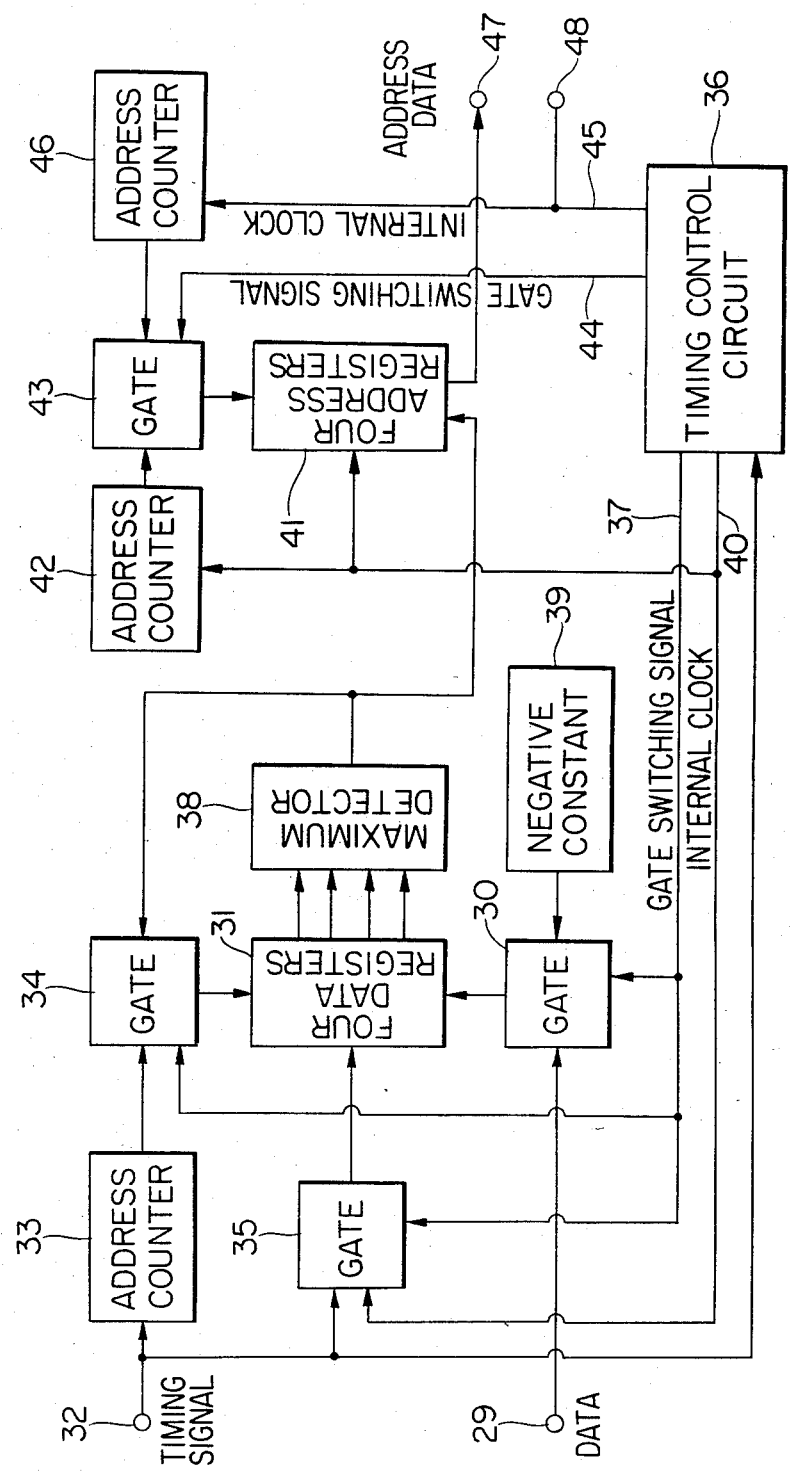
FIG. 6 is a block diagram of a preference circuit of the image signal processing apparatus shown in FIG. 5.

FIG. 6 is a block diagram of the preference circuit 27. Four data within the 2×2 scanning window are supplied to a data input terminal 29 and are stored through a gate 30 in predetermined memory areas of four data registers 31 respectively corresponding to the four positions of the scanning window. The predetermined positions are specified such that an output from an address counter 33 for counting timing pulses from a timing signal input terminal 32 is supplied to the registers 31 through a gate 34. Timing pulses from the timing signal input terminal 32 serve as a data write clock of the registers 31 through a gate 35, and are also supplied to a timing control circuit 36 which then generates a gate switching signal onto a signal line 37. The gate switching signal on the signal line 37 drives the gates 30, 34 and 35 so as to set the registers 31 in an input mode for receiving the four data from the data input terminal 29. When all the data are stored in the registers 31, a maximum detector 38 detects a maximum value of the four data stored in the registers 31 and generates a data address of the maximum value. At this time, the timing control circuit 36 drives the gates 30, 34 and 35 in response to the gate switching signal on the signal line 37 so as to set the registers 31 in the updating mode. In this condition, the data address of the maximum value is set in the registers 31 through the gate 34, and a negative constant from a register 39 is set in the registers 31 through the gate 30. An internal clock signal generated from the timing control circuit 36 through a signal line 40 serves as a data write clock of the registers 31 through the gate 35. As a result, the maximum data of the registers 31 is updated to negative data. In this state, when four internal clocks are generated onto the signal line 40, all the contents of the registers 31 are converted to negative data. The data address corresponding to the maximum data of the first set of four data stored in the registers 31 appears at the output terminal of the maximum detector 38 in response to the first internal clock. In response to the following three internal clocks, the corresponding descending addresses appear at the output terminal of the maximum detector 38. These addresses serve as write data of four address registers 41 and are sequentially stored in these registers 41. The internal clock on the signal line 40 serves as a write clock and is also supplies to an address counter 42. An output from the address counter 42 is supplied to the address registers 41 through a gate 43 to specify the address locations. A signal supplied from the timing control circuit 36 onto a signal line 44 drives the gate 43 so as to set the data write mode. In other words, the output from the address counter 42 is supplied to the address registers 41. After the four address data are written in the address registers 41, respectively, the signal appearing on the signal line 44 drives the gate 43 so as to set the address registers 41 in the data read mode. When the timing control circuit 36 generates a read clock on a signal line 45, an address counter 46 counts this clock. A count signal from the address counter 46 is supplied to the address registers 41 through the gate 43 so as to read out address data from the address registers 41. In this manner, the address data from the preference circuit 27 is generated at an output terminal 47.

The read clock on the signal line 45 also appears at an output terminal 148 and is used as a timing signal for other circuits indicated in other block diagrams. The address counters 33, 42 and 46 comprise two-bit counters which are reset by a scanning synchronizing pulse (not shown), respectively. Adjustment of the signal timing, such as delay time compensation, during manufacture of the hardware is apparent to those who are skilled in the art, and a detailed description thereof will be omitted.

The address data appearing at the output terminal 47 comprise four two-bit data 00, 01, 10 and 11. The address signals of the image data memories 20 and 22 in FIG. 5 are prepared by the address generator 23. Therefore, two-bit data 00, 01, 10 and 11 are address signals within the scanning window. If these two-bit data correspond to the original image signals within the scanning window 6 in FIG. 2D, the two-bit data 00 corresponds to the data $D''''_{m-1,n-1}$; 01, $D'''_{m-1,n}$; 10, $D''_{m,n-1}$; and 11, $D'_{m,n}$. Therefore, the data supplied to the input terminal 29 must appear in the sequence corresponding to the addresses within the scanning window.

Figure 7:
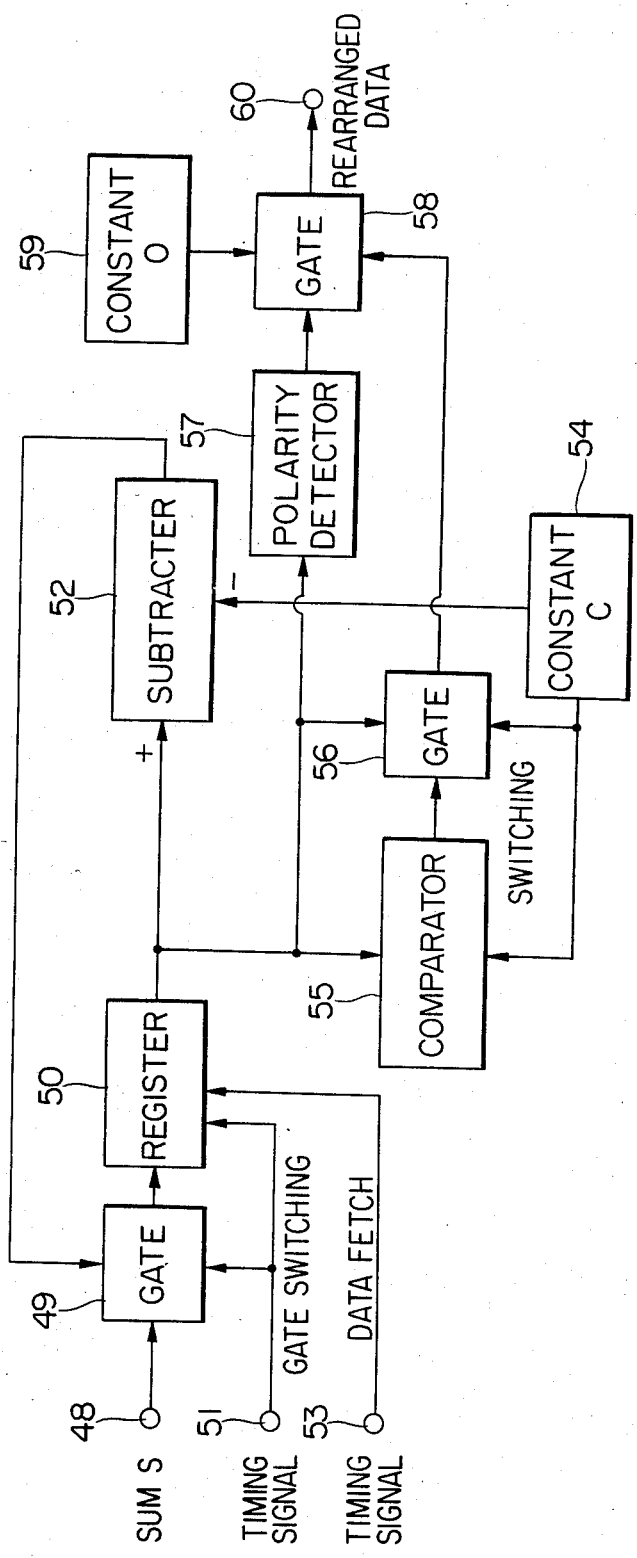
FIG. 7 is a block diagram of a rearrangement circuit of the image signal processing apparatus shown in FIG. 5.

FIG. 7 is a block diagram of the rearrangement circuit 28 shown in FIG. 5. The sum S of the data within the scanning window is supplied to an input terminal 48 and is set in a register 50 through a gate 49. A timing signal supplied to an input terminal 51 drives the gate 49 and the register 50 so as to gate the signal from the input terminal 48 while the sum S is set in the register 50. The signal from the input terminal 48 is thus stored in the register 50. Otherwise, the gate 49 gates the signal from a subtracter 52. The data fetch timing of the register 50 is controlled by a timing signal supplied to an input terminal 53. The subtracter 52 subtracts the constant C set in a register 54 from a content of the register 50. A subtracted result is generated by the subtracter 52. The output from the register 50 is generated such that the initial sum S is decremented by the constant C every time the timing signal is supplied to the input terminal 53. A comparator 55 compares the content of the register 50 with the content C of the register 54. When the content of the register 50 is equal to or greater than that of the register 54, a gate 56 is enabled to set the content C of the register 54 as the output of the gate 56. Otherwise, the gate 56 is enabled to generate the content of the register 50 as an output of the gate 56. A polarity detector 57 drives a gate 58. When the content of the register 50 is positive, the output from the gate 56 is generated as the output from the gate 58. However, when the content of the register 50 is negative, the constant 0 set in a register 59 is generated as the output from the gate 58, thereby generating rearranged data at an output terminal 60.

Figure 8:
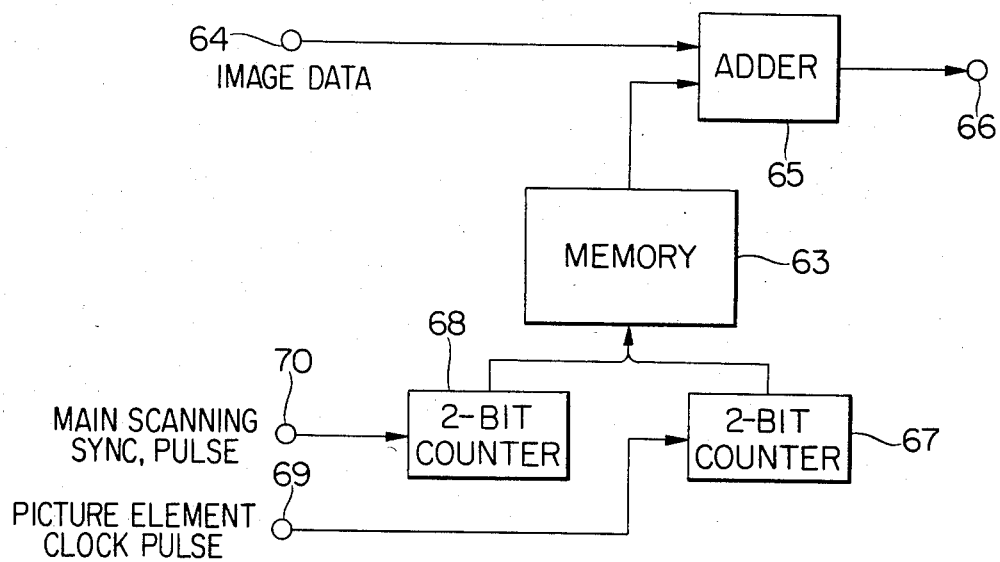
FIG. 8 is a block diagram of an additional data adder of the image signal processing apparatus shown in FIG. 5.
Figure 9A:
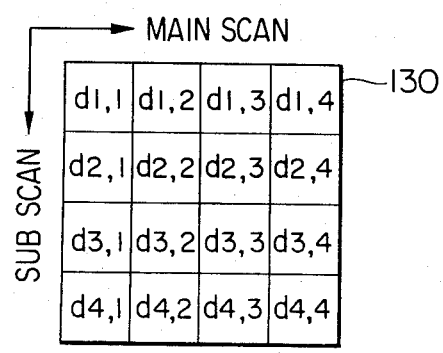
FIGS. 9A and 9B, respectively, are representations for explaining a storage state of the adder shown in FIG. 8.
Figure 9B:
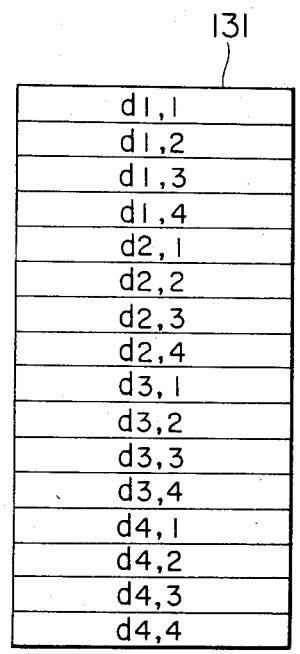

FIG. 8 is a block diagram of the additional data adder 18 shown in FIG. 5. Assume that the data from a 4×4 matrix are repeatedly added to accumulate all data of the original image data. The matrix data are stored in a memory 63 in a format shown in FIG. 9B. The image data supplied to an input terminal 64 is added by an adder 65 to the data read out from the memory 63, and sum data appears at an output terminal 66. The address signal for reading out data from the memory 63 is obtained such that the output from a two-bit counter 67 constitutes lower bits of the address signal and the output from a two-bit counter 68 constitutes upper bits of the address signal. The counter 67 counts picture element clock pulses supplied to an input terminal 69, and the counter 68 counts the main scanning in synchronizm pulse supplied to an input terminal 70. Therefore, the data shown in FIG. 9A can be read out in synchronism with the image signal data as scanning is performed along the main scanning and subscanning directions.

The image signal processing according to the first embodiment can be performed only on the image reader side. Therefore, a circuit is added to a transmitter side of a current fascimile system or the like. Unlike the conventional method wherein an image having a two-valued or binary image portion (e.g., a character and a line drawing) and a halftone image portion is subject to degradation in quality of the reproduced image, the image processing of the present invention overcomes the conventional problem. Furthermore, unlike the conventional dither method wherein the number of pseudo halftone levels is limited by the scanning window size and the size of the scanning window size must be increased in order to increase the number of levels, thus resulting in degradation of the resolution and hence in a decrease in the number of reproducible colors, the first embodiment can be suitably applied to color image processing since the levels continuously change.

In color image processing, the level distributions of the additional data are misaligned to obtain a yellow (Y) signal, a cyan (C) signal, a magenta (M) signal, and a black (B) signal, thereby decreasing misregistration of color components.

Figure 3:
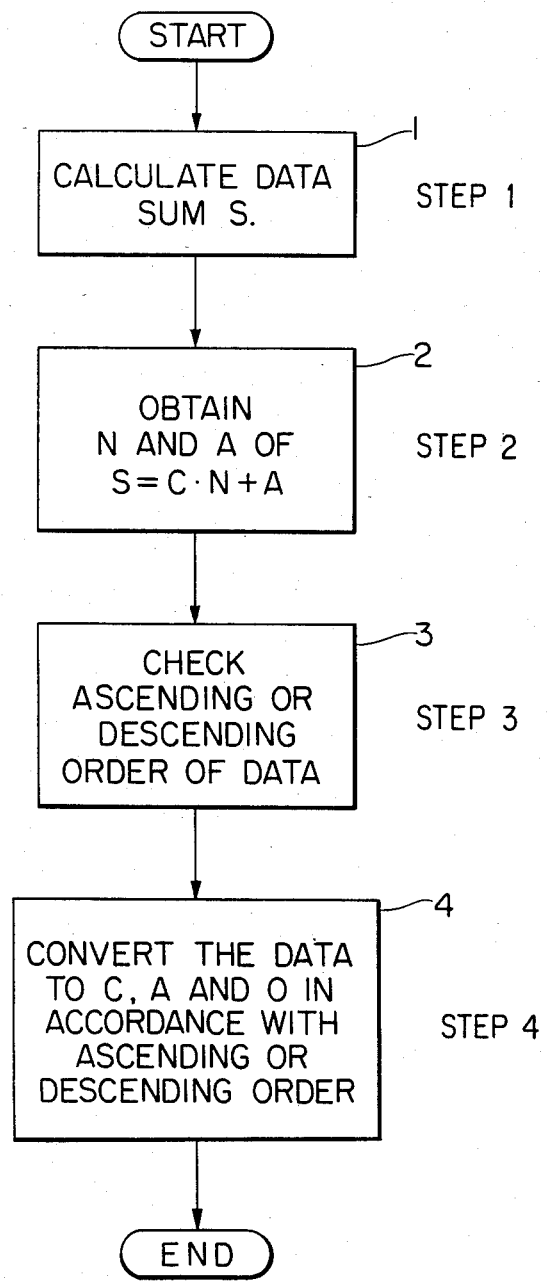
FIG. 3 is a flow chart for explaining data conversion according to the present invention.

A second embodiment of the present invention will be described hereinafter. In the data processing described with reference to FIG. 1, the converted data are arranged in accordance with larger original image data values within the scanning window. Therefore, when regularity is imparted to the preference data, the converted data distribution can have regularity in accordance wth the degree of preference. At the same time, the degree of regularity can serve to cancel the overly enhanced contrast between the larger values and smaller values, as described with reference to FIG. 4. More particularly, the data 13 shown in FIG. 4A are used as preference data in place of the data shown in FIG. 2B. In this case, unlike the data conversion steps 1 to 4 for the scanning window 6 as illustrated in the flow chart in FIG. 3, the undesired edge enhancement can be further eliminated. The data in FIG. 4B are arranged in a regular array pattern and can be arbitrarily prepared. An example is illustrated in FIG. 4B. FIG. 4B shows a case wherein the additional data corresponding to 4×4 picture elements are converted. The data values are set as quantized values each obtained by quantizing the original data 11 by 8 bits (0 to 255). The additional data is preset to be $\frac{1}{8}$ or less of the maximum value 255 of the original image data. The value is preferably preset at a value slightly greater than the noise component of the original image data.

Figure 10:
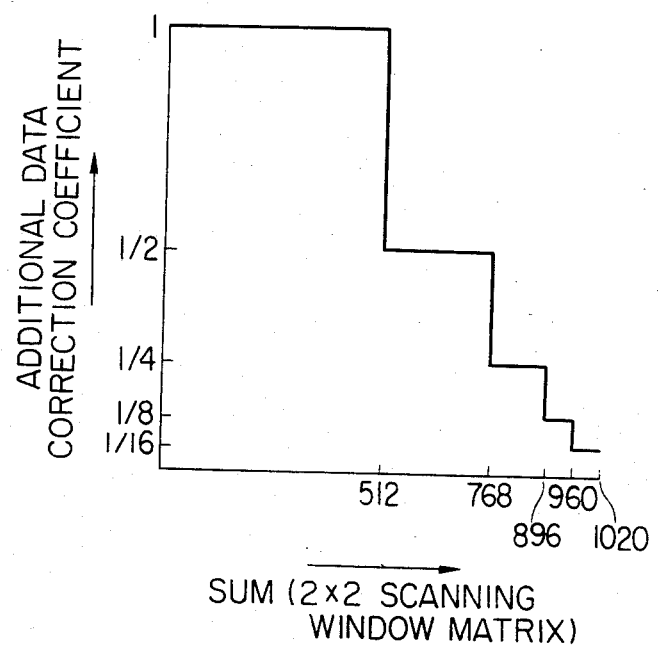
FIG. 10 is a graph for explaining the relationship between the additional data correction coefficient and the sum S.

In general, the original image data obtained by image scanning comprises a reflectance signal. The whitish portion of the image has many noise components, while the blackish portion thereof has few noise components. The reflectance signal does not have linearity with respect to the density level of the original image. Therefore, it is better to correct the magnitude of the additional data in accordance with the magnitude of the original image data. FIG. 10 shows a case for correcting the magnitude of the additional data. The scanning window 6 comprises a 2×2 matrix, and the original image data 11 comprises 8-bit quantized data. The data sum S within the scanning window 6 is plotted along the abscissa, and the correction coefficient of the additional data is plotted along the ordinate.

In the case shown in FIG. 10, the correction coefficients to be multiplied with the additional data are given as $\frac{1}{2}$, $\frac{1}{4}$, $\frac{1}{8}$ and 1/16 in accordance with the values of the data sum S. These correction coefficients are sufficient in a practical application. However, ideally, the amplitude correction efficients of the additional data have a given rate when the data sum S of the reflectance signals are converted in accordance with the density levels of the original image.

The image signal processing will be described with reference to the flow chart in FIG. 11 in the light of the above description.

It should be noted that the symbols used in the flow chart are defined as follows:

$G_1$ and $G_2$: Image signal memories $W_1$: Scanning window for the image data stored in the image data memory $G_1$ $D_{m,n}$, $D_{m,n-1}$, $D_{m-1,n}$ and $D_{m-1,n-1}$: Data within the scanning window $W_1$ $W_2$: Scanning window for the image data stored in the image data memory $G_2$ $D_{m,n}$, $D'_{m,n-1}$, $D''_{m-1,n}$ and $D'''_{m-1,n-1}$: Data within the scanning window $W_2$ before data conversion at the current scanning positions. The number of marks "'" indicates the number of conversion steps.

$D'_{m,n}$, $D''_{m,n-1}$, $D'''_{m-1,n}$ and $D''''_{m-1,n-1}$: Data within the scanning window $W_2$ after data conversion at the current scanning positions. The number of marks "'" indicates the number of conversion steps.

E: Error correction value
$S_m$: Data sum within the scanning window $W_2$
S: Value of $S_m+E$
M: The number of picture elements within the scanning windows $W_1$ and $W_2$ for M=4
C: Predetermined image signal level
N: Integer falling in the range $0 \leq N \leq M$
A: $0 \leq A < C$
$d_{m,n}$, $d_{m,n-1}$, $d_{m-1,n}$ and $d_{m-1,n-1}$: Additional data
k: Amplitude correction efficient, which changes in accordance with the sum S
$r_{m,n}$, $r_{m,n-1}$, $r_{m-1,n}$ and $r_{m-1,n-1}$: preference data given as follows:

$$r_{m,n} = k \times d_{m,n} + D_{m,n}$$

$$r_{m,n-1} = k \times d_{m,n-1} + D_{m,n-1}$$

$$r_{m-1,n} = k \times d_{m-1,n} + D_{m-1,n}$$

$$r_{m-1,n-1} = k \times d_{m-1,n-1} + D_{m-1,n-1}$$

V: quantizing level.

(1) The image data are stored in the memories $G_1$ and $G_2$ (the image data are stored in units of picture elements or scanning lines, while the following processing can be performed. However, the following operation is performed in this case after all image data are stored).

(2) The scanning window $W_1$ is set in the position corresponding to the start position of the main scanning and subscanning of the image data stored in the memory $G_1$. The scanning window $W_2$ is set in the position corresponding to the start position of the main scanning and subscanning of the image data stored in the memory $G_2$.

(3) The error correction value is set to E=0 as the initial value before main scanning.

(4) The sum S of the sum $S_m$ within the scanning window $W_2$ and the error correction values is obtained.

(5) and (6) The sum S is subjected to comparison to obtain N and A. If $0 > S$, N=0 and A=0 in (7). However, if $S > C \times M$, N=M and A=0 in (8). Otherwise, N and A which satisfy $S = C \times N + A$ are obtained.

(10) The amplitude of the additional data is corrected in accordance with the sum S.

(11) The preference data $r_{m,n}$, $r_{m,n-1}$, $r_{m-1,n}$ and $r_{m-1,n-1}$ are calculated as follows:

$$r_{m,n} = k \times d_{m,n} + D_{m,n}$$

$$r_{m,n-1} = k \times d_{m,n-1} + D_{m,n-1}$$

$$r_{m-1,n} = k \times d_{m-1,n} + D_{m-1,n}$$

$$r_{m-1,n-1} = k \times d_{m-1,n-1} + D_{m-1,n-1}$$

and the data within the scanning window $W_2$ which correspond to the preference data (in the order of larger data values) are updated in the following manner.

C is assigned to N picture element, A to an (N+1)th picture element, and 0 to remaining picture elements.

(12) The data $D''''_{m-1,n-1}$ within the scanning window $W_2$ is given as $P_{1ST}$.

(13) The data $P_{1ST}$ is compared with the level V. When the data $P_{1ST}$ is greater than the level V, the data $P_{2ND}$ is given as C in (14). However, when the data $P_{1ST}$ is smaller than the level V, the data $P_{2ND}$ is given as 0 in (15). The value of the data $D''''_{m-1,n-1}$ is finally converted to binary data in accordance with the level V. In this sense, the data $D''''_{m-1,n-1}$ can be given as the value of the data $P_{2ND}$ or given per se.

(16) The error correction value E used for correction in the next scanning window position is obtained as $P_{1ST} - P_{2ND}$.

(17) Each of the scanning windows $W_1$ and $W_2$ is moved in the main scanning direction by one picture element.

(18) It is checked whether or not main scanning is completed. If NO in this step, return to (4).

(19) If YES in (18), the scanning windows $W_1$ and $W_2$ return to the start position of main scanning, and each scanning window is moved by one picture element along the subscanning direction.

(20) It is then checked whether or not subscanning is completed. If NO, the flow returns to (3).

Figure 11A:
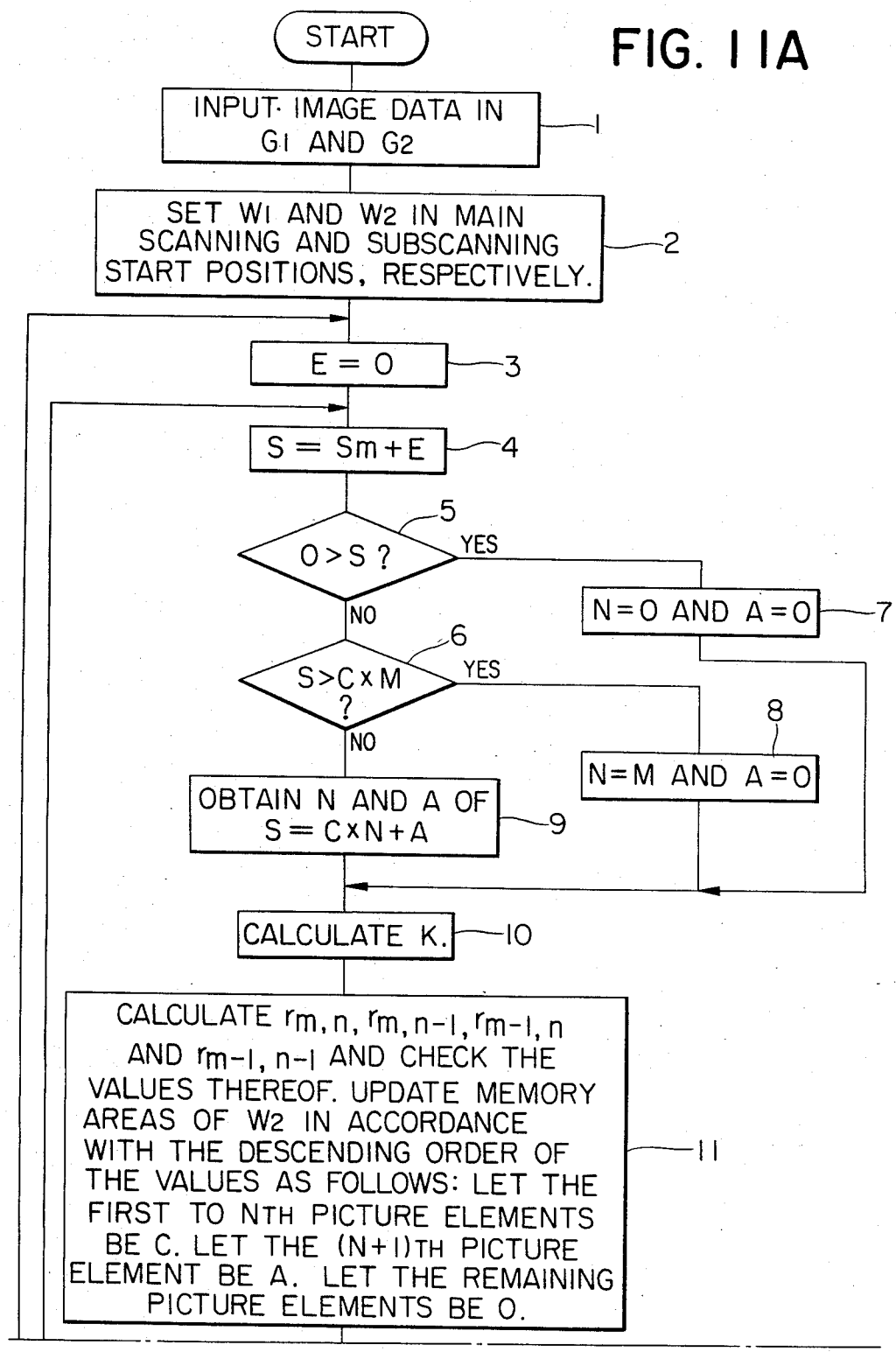

According to steps (1) to (20) in FIG. 11, the pseudo halftone display is not subject to degradation of image quality which is caused by degradation of the resolution of the two-valued image.

Figure 12:
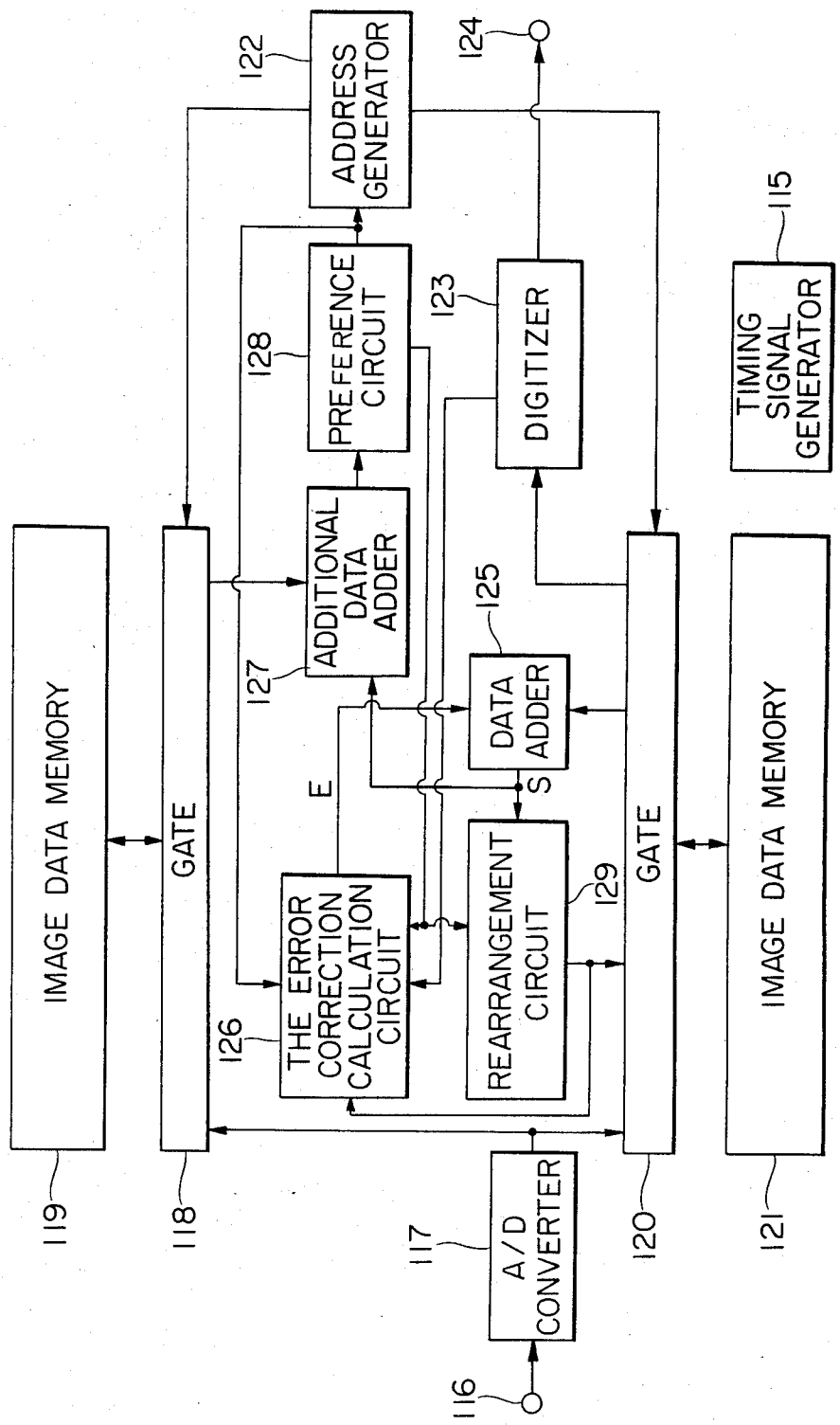
FIG. 12 is a block diagram of an image signal processing apparatus of the second embodiment to which the method shown in FIG. 11 is applied.

An image signal processing apparatus according to the second embodiment of the present invention will be described with reference to FIG. 12. FIG. 12 is a block diagram of the image signal processing apparatus according to the second embodiment of the present invention.

Referring to FIG. 12, reference numeral 115 denotes a timing signal generator for supplying timing signals to blocks (to be described later) of FIG. 12. The timing signal lines between the timing signal generator 115 and the blocks are omitted. Reference numeral 117 denotes an A/D converter for converting to a digital image signal an analog image signal which is supplied through an input terminal 116; 119 and 121, image data memories for storing or generating digital image signals in response to address signals supplied through gates 118 and 120, respectively; and 122, an address generator for supplying address signals to the gates 118 and 120 so as to control these gates 118 and 120. Reference numeral 123 denotes a digitizer for quantizing the rearranged data into binary data so as to store the binary data in an image data memory or the like through an output terminal 124. Reference numeral 125 denotes a data adder for adding the scanning window data to error correction data E from an error correction calculation circuit 126 so as to obtain a sum S. Reference numeral 127 denotes an additional data adder for adding the additional data to the respective data (within the scanning window) in accordance with the sum obtained by the adder 125. Reference numeral 128 denotes a preference circuit for ordering the outputs of the additional data adder 127 from the larger values. Reference numeral 129 denotes a rearrangement circuit for preparing conversion data from the sum S supplied from the adder 125 and for rearranging the data.

The operation of the image signal processing apparatus having the arrangement described above will now be described. The analog image signal obtained by scanning the original image is supplied to the input terminal 116 and is converted by the A/D converter 117 to a digital image signal. The digital image signal is stored in the image data memory 119 through the gate 118. The digital image signal is also stored in the image data memory 121 through the gate 120. The gates 118 and 120 are controlled by the address generator 122. The address generator 122 supplies address designation signals to the memories 119 and 121 so as to access the addresses of the memories 119 and 121. The data stored in the memory 119 are used as preference data, and the data stored in the memory 121 are updated when data conversion is performed by rearrangement.

All data which are data-converted by the rearrangement are read out from the memory 121 through the gate 120 and the digitizer 123, and appear as output image signals at the output terminal 124. These output image signals are recorded in an image data memory (not shown). The adder 125 adds the sum S of the error correction data E (from the error correction calculation circuit 126) to the data (within the scanning window) obtained from the memory 121 through the gate 120. The additional data adder 127 controls the magnitude of each additional data prepared inside the additional data adder 127 in accordance with the sum S obtained from the adder 125, so as to add each value of the additional data to each data (within the scanning window) obtained from the memory 119 through the gate 118. Each sum data is supplied from the adder 127 to the preference circuit 128. The preference circuit 128 determines all the data addresses of the memory 121 which correspond to the scanning window position, and orders the data from the adder 127, starting from the larger values. Signals designating these addresses are supplied to the address generator 122 and the error correction calculation circuit 126. These signals are also supplied to the error correction calculation circuit 126 and the rearrangement circuit 129 at the same timing at which the address designation signals are supplied to the address generator 122 and the error correction calculation circuit 126. The rearrangement circuit 129 prepares conversion data in accordance with the sum S supplied from the data adder 125 and sequentially stores the conversion data through the gate 120 at addresses of the memory 121 which are accessed by the address generator 122. The error correction calculation circuit 126 discriminates the data $P_{1ST}$ as the last converted value ($D''''_{m-1,n-1}$ in FIG. 2D) within the scanning window from the conversion data from the rearrangement circuit 129 in accordance with the address and timing data from the preference circuit 128. The error correction calculation circuit 126 compares the data $P_{1ST}$ with the quantizing level V so as to obtain the data $P_{2ND}$ to be 0 or C. A difference $P_{1ST}-P_{2ND}$ is given as the error correction value E for the next scanning window.

The above operation is repeated to perform image signal processing.

The additional data adder 127, the preference circuit 128, the rearrangement circuit 129 and the error correction calculation circuit 126 which are shown in FIG. 12 will be described in detail with reference to FIGS. 13 to 15, respectively.

Figure 13:
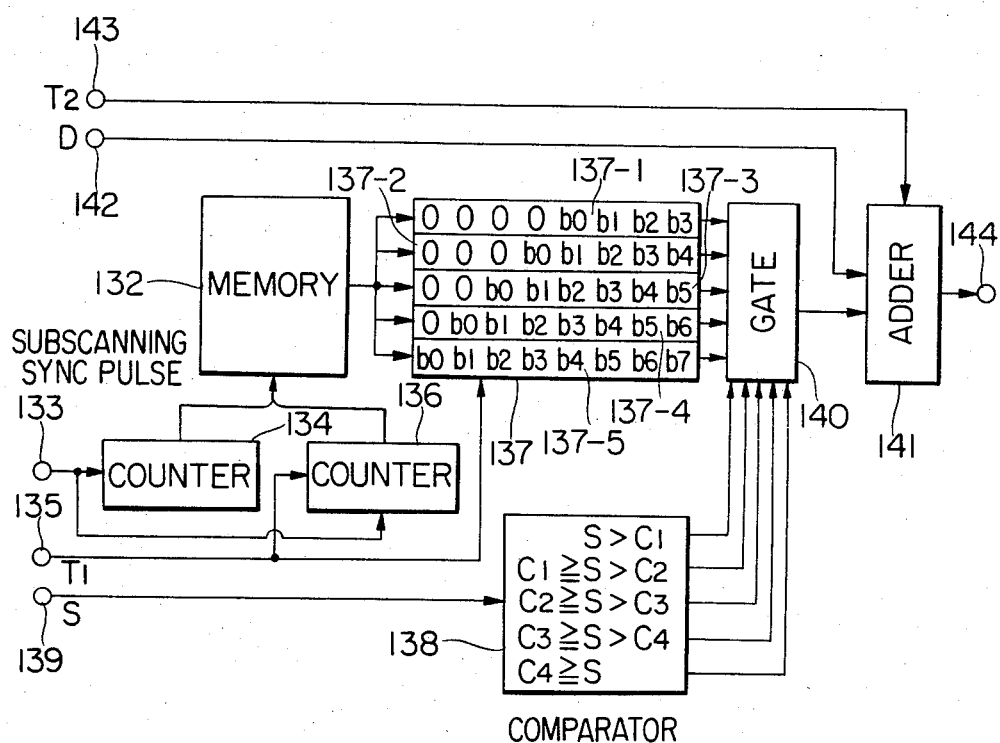
FIG. 13 is a block diagram of an additional data adder of the image signal processing apparatus shown in FIG. 12.
Figure 14:
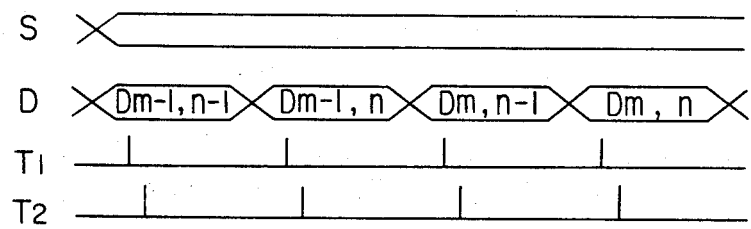
FIG. 14 is a timing chart for explaining the operation of the adder shown in FIG. 13.

FIG. 13 is a block diagram showing the detailed configuration of the additional data adder 127 shown in FIG. 12. Assume that the additional data is repeatedly added to the original image data with respect to the 4×4 matrix 130 shown in FIG. 9A. A memory 132 stores matrix data in a data format 131 shown in FIG. 9B. The memory 132 produces a data consisting of, as upper addresses, the content of a two-bit counter 134 for counting subscanning synchronizing pulses supplied to an input terminal 133, and as lower addresses, the content of a two-bit counter 136 for counting timing pulses $T_1$ supplied to an input terminal 135. The subscanning synchronizing pulse supplied to the input terminal 133 resets the counter 136, and the timing pulse $T_1$ supplied to the input terminal 135 causes five registers 137 to fetch the output data from the memory 132. Now assume that the addition data comprises an 8-bit data b0 to b7 (where b0 is the most significant bit). The components of the 8-bit data are stored as 1/1, 1/2, 1/4, 1/8, 1/16 data in the five registers, respectively. A comparator 138 compares the contents of the sum S supplied to an input terminal 139 with internal constants $C_1$ to $C_4$. Any one of the output lines of the five registers is set at logic "1", and the remaining lines are set at logic "0". The constants $C_1$, $C_2$, $C_3$ and $C_4$ are given as 960, 896, 766 and 512, respectively, shown in FIG. 10. A gate 140 gates one of the output signals from the registers 137 in accordance with the output signal from the comparator 138 as follows:

The content of the register 137-1 for $S>C_1$
The content of the register 137-2 for $C_1 \geq S > C_2$
The content of the register 137-3 for $C_2 \geq S > C_3$
The content of the register 137-4 for $C_3 \geq S > C_4$
The content of the register 137-5 for $C_4 \geq S$.

An adder 141 adds the data (supplied from the memory 119 to an input terminal 142) to the output from the gate 140 in response to a timing pulse $T_2$ supplied to an input terminal 143. Sum data appears at an output terminal 144. FIG. 14 shows the relationship among the sum S at the input terminal 139, the data D at the input terminal 142 (FIG. 2B), the timing pulse $T_1$ at the input terminal 135, and the timing pulse $T_2$ at the input terminal 143.

The preference circuit 128 and the rearrangement circuit 129 are substantially the same as those shown in FIGS. 6 and 7, respectively.

The error correction calculation circuit 126 will be described in detail.

Figure 15:
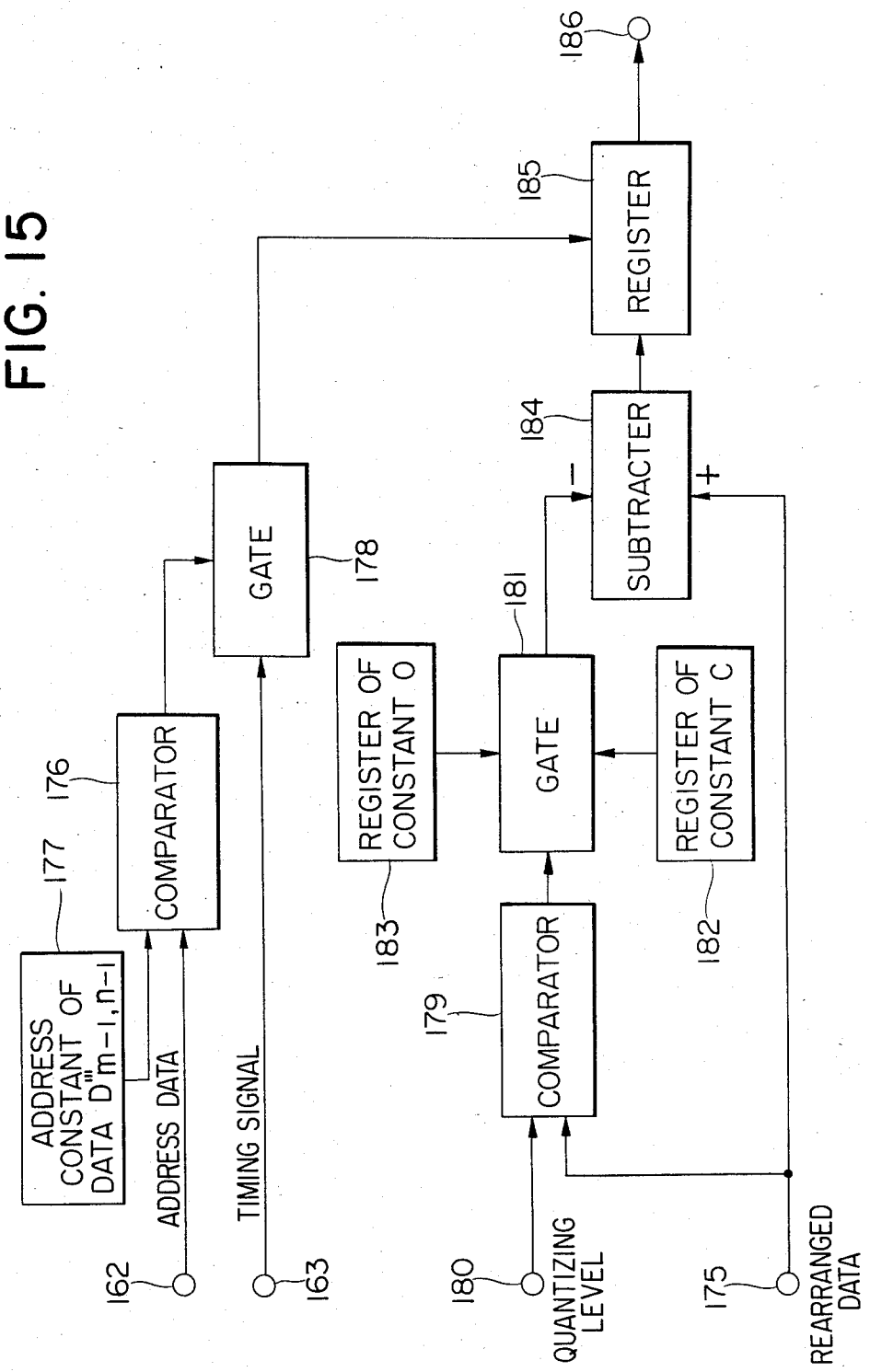
FIG. 15 is a block diagram of an error correction calculation circuit of the image signal processing apparatus shown in FIG. 12.

FIG. 15 is a block diagram showing the detailed configuration of the error correction calculation circuit 126 shown in FIG. 12. A comparator 176 compares the address constant from a register 177 with address data supplied to an input terminal 162. When a coincidence is established, the comparator 176 drives a gate 178, so that the gate 178 gates a timing signal supplied to an input terminal 163. The address constant of the register 177 is set to be 00 corresponding to the address of the last converted data $D''''_{m-1,n-1}$ within the scanning window. A comparator 179 compares the quantizing level V supplied to an input terminal 180 with the rearranged data supplied to an input terminal 175. When the rearranged data is greater than the quantizing level V, an output signal is supplied from the comparator 179 to a gate 181 which is then driven. The constant C from a register 182 is gated through the gate 181. However, when the rearranged data is smaller than the quantizing level V, the gate 181 is driven so as to gate the constant 0 of a register 183. A subtracter 184 subtracts the output of the gate 181 from the rearranged data at the input terminal 175. A register 185 fetches the subtraction result from the subtracter 184, so that this result appears as the error correction value E at a terminal 186.

As is apparent from the above description, pseudo halftone image free of degradation can be obtained, and can be read by an image reader. For example, in the conventional fascimile system, a circuit is added to the transmission side to obtain the effect of the present invention. Conventionally, in an image consisting of a two-valued or binary image portion and a halftone image portion, one of the image portions is degraded. However, according to the present invention, neither image portions is degraded in image display and recording. The conventional dither method has a limited number of pseudo halftone levels in accordance with the matrix size and has a low resolution when the size of the scanning window is increased. As a result, the conventional dither method is not practical in color image processing because the number of reproducible color shades is decreased. However, according to this embodiment of the present invention, the reproducible levels are substantially continuous, thereby providing optimum color image processing. Furthermore, in color image processing, the additional data level distributions can be misaligned with respect to the yellow (Y), cyan (C), magenta (M) and black (B) signals, thereby preventing misregistration of the color components. In addition to this advantage, the regularity of the additional data improves the bandwidth compression efficiency of a predictive coding scheme or the like, resulting in a variety of applications.

An image signal processing apparatus according to a third embodiment of the present invention will now be described with reference to FIG. 16.

Figure 16:
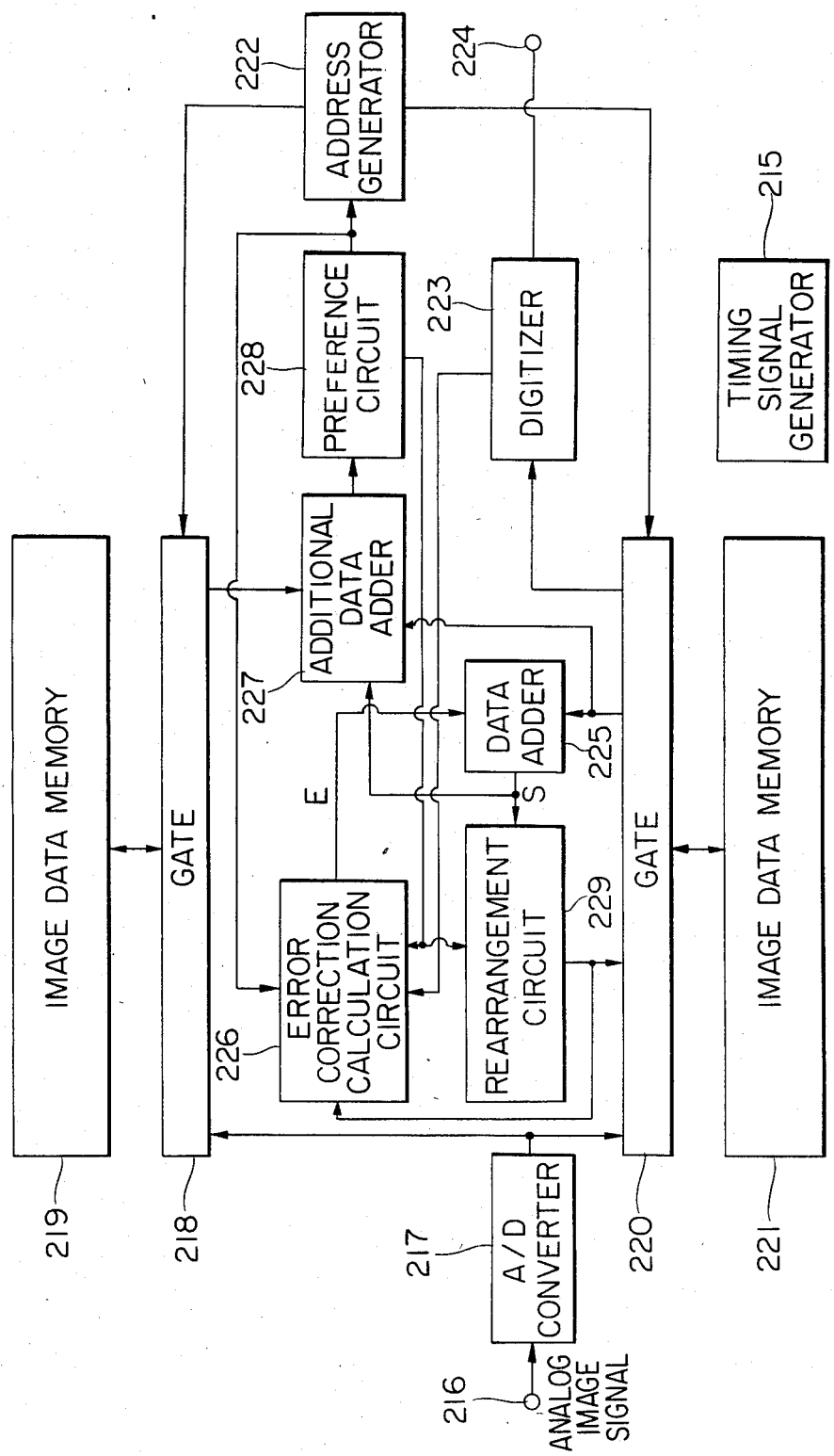
FIG. 16 is a block diagram of an image signal processing apparatus according to a third embodiment of the present invention.

Referring to FIG. 16, reference numeral 215 denotes a timing signal generator for supplying timing signals to blocks (to be described later). The signal lines between the timing signal generator 215 and the respective blocks are omitted. Reference numeral 217 denotes an A/D converter for converting to a digital image signal an analog image signal which is supplied through an input terminal 216. Reference numerals 219 and 221 denote image data memories storing or producing the digital image signals through gates 218 and 220, respectively. Reference numeral 222 denotes an address generator for supplying address signals to the gates 218 and 220 so as to control the gates 218 and 220. Reference numeral 223 denotes a digitizer for quantizing the rearranged data to binary data and for storing it in an image recording apparatus or the like through an output terminal 224. Reference numeral 225 denotes a data adder for adding the data within the scanning window and the error correction data E supplied from an error correction calculation circuit 226 so as to obtain a sum S. Reference numeral 227 denotes an additional data adder for adding the additional data to each data converted to one of several constitutent areas of the scanning window. Reference numeral 228 denotes a preference circuit for arranging the output data from the adder 227 in accordance with an order starting from the larger values. Reference numeral 229 denotes a rearrangement circuit for preparing conversion data in accordance with the sum S' supplied from the adder 225 and for rearranging the conversion data. The image signal processing apparatus shown in FIG. 16 is substantially the same as that shown in FIG. 12, except for the following arrangement. The value of data which is obtained within the scanning window and which is read out from the memory 221 through the gate 220 becomes reduced to any selected fraction of its former value within the range from about ⅓ to about 1/5, and is added to the internally prepared additional data. Thereafter, the value of the sum data is controlled by the sum S obtained from the data adder 225. Each sum value is added to the data which is obtained within the scanning window and which is read out from the memory 219 through the gate 218. The resultant data is supplied to the preference circuit 228.

The operation of the image signal processing apparatus having the configuration described above will be described. The analog image signal supplied to the input terminal 216 by scanning the original image is supplied to the A/D converter 217. The analog image signal is then converted by the A/D converter 217 to a digital image signal. The digital image signal is stored in the image data memory 219 through the gate 218 and in the image data memory 221 through the gate 220. In this case, the gates 218 and 220 are controlled by the address generator 222. The address generator 222 accesses the addresses of the memories 219 and 221 so as to read out data therefrom or write it therein. In subsequent processing to be described later, the data stored in the memory 219 are used as preference data, and the data stored in the memory 221 are updated in accordance with data conversion by rearrangement. The rearranged data is read out from the memory 221 through the gate 220 and is supplied to the digitizer 223. The digitizer 223 supplies an output image signal which appears at the output terminal 224 and which is stored in an image recording apparatus (not shown). The data adder 225 adds the error correction data E obtained by the error correction calculation circuit 226 to the data which is obtained within the scanning window and which is read out from the memory 221 through the gate 220 so as to obtain the sum S. The additional data adder 227 reduces the value of the data obtained with the scanning window and read out from the memory 221 through the gate 220 to any selected fraction of its former value within the range from about ⅓ to about 1/5. The reduced data is added by the adder 227 to the additional data. Thereafter, the value of the sum data is controlled in accordance with the sum S obtained from the adder 225. The sum data is further added to the data which is obtained within the scanning window and which is read out from the memory 219 through the gate 218. Resultant sum data is then supplied to the preference circuit 228. The preference circuit 228 determines all the data addresses of the memory 221 which correspond to the scanning window position in accordance with the order starting from the larger values of data obtained from the adder 227. Signals designating these addresses are supplied from the preference circuit 228 to the address generator 222 and the error correction calculation circuit 226. These address designation signals are also supplied to the error correction calculation circuit 226 and the rearrangement circuit 229 at the same timing at which they are supplied to the address generator 222 and the error calculation circuit 226. The rearrangement circuit 229 prepares conversion data in accordance with the sum S supplied from the data adder 225 and sequentially stores the conversion data through the gate 220 at addresses of the memory 221 which are accessed by the address generator 222. The error correction calculation circuit 226 discriminates the data $P_{1ST}$ as the last converted value ($D''''_{m-1,n-1}$ in FIG. 2D) within the scanning window from the conversion data from the rearrangement circuit 229, in accordance with the address and timing data from the preference circuit 228. The error correction calculation circuit 226 compares the data $P_{1ST}$ with the quantizing level V so as to obtain the data $P_{2ND}$ to be 0 or C. A difference $P_{1ST}-P_{2ND}$ is given as the error correction value E for the next scanning window.

The above operation is repeated to perform image signal processing.

The additional data adder 227 shown in FIG. 16 will be described in detail with reference to FIG. 17.

Figure 17:
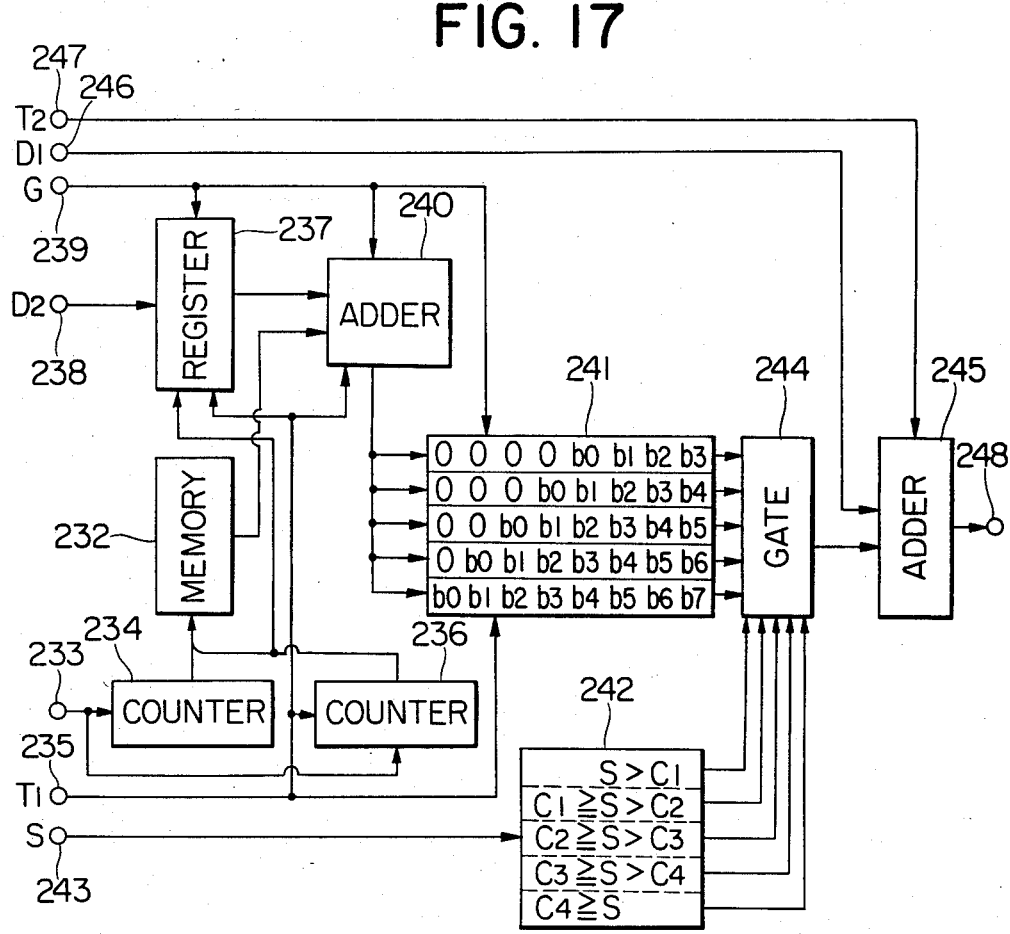
FIG. 17 is a block diagram of an additional data adder of the image signal processing apparatus shown in FIG. 16.

FIG. 17 is a block diagram showing the detailed configuration of the additional data adder 227 shown in FIG. 12. Assume that the additional data is repeatedly added to the original image data with respect to the 4×4 matrix 130 shown in FIG. 9A. A memory 232 stores matrix data in a data format 131 shown in FIG. 9B. The memory 232 produces a data consisting of, as upper addresses, the content of a two-bit counter 234 for counting subscanning synchronizing pulses supplied to an input terminal 233, and as lower addresses, the content of a two-bit counter 236 for counting timing pulses $T_1$ supplied to an input terminal 235. The subscanning synchronizing pulse supplied to the input terminal 233 resets the counter 236. A register unit 237 has four registers which respectively receive four data $D_2$ (FIG. 2C) at an input terminal 238 in response to the timing pulses $T_1$ supplied to the input terminal 235, and reduces the input data such that each of their values is reduced to any selected fraction of its former value within the range from about $\frac{1}{3}$ to about 1/5 (e.g., when 8-bit data is received, and the upper 4-bit data is produced, the value is reduced to 1/16). The register unit 237 fetches the data $D_2$ when a timing signal G at an input terminal 239 is set at logic "1"; and it produces the data when the timing signal G is set at logic "0". The registers at the input/output operation are selected in accordance with the content of the counter 236. When the timing pulse G at the input terminal 239 is set at logic "0", an adder 240 adds the output from the register unit 237 to the output from the memory 232 for every timing pulse $T_1$ supplied to the input terminal 235. A register unit 241 fetches the outputs at the input terminal 235 in five internal registers in response to the timing pulse $T_1$ at the input terminal 235 when the timing signal G at the input terminal 239 is set at logic "0". Now assume that the addition data comprises an 8-bit data b0 to b7 (where b0 is the most significant bit). The components of the 8-bit data are stored as 1/1, $\frac{1}{2}$, $\frac{1}{4}$, $\frac{1}{8}$, 1/16 data in the five registers, respectively. A comparator 242 compares the contents of the sum S supplied to an input terminal 243 with internal constants $C_1$ to $C_4$. Any one of the output lines of the five registers is set at logic "1", and the remaining lines are set at logic "0". The constants $C_1$, $C_2$, $C_3$ and $C_4$ are given as 960, 896, 766 and 512, respectively, as shown in FIG. 10. A gate 244 gates one of the output signals from the registers of the register unit 241 in accordance with the output signal from the comparator 242 as follows:

The content of the 1/16 data register for $S>C_1$
The content of the $\frac{1}{8}$ data register for $C_1 \geq S > C_2$
The content of the $\frac{1}{4}$ data register for $C_2 \geq S > C_3$
The content of the $\frac{1}{2}$ data register for $C_3 \geq S > C_4$
The content of the 1/1 data register for $C_4 \geq S$.

Figure 18:
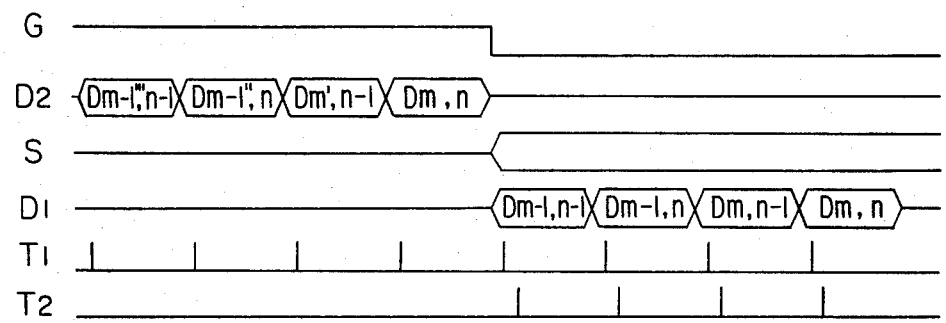
FIG. 18 is a timing chart for explaining the operation of the adder shown in FIG. 17.

An adder 245 adds the data $D_1$ (supplied to an input terminal 246) to the output from the gate 244 in response to a timing pulse $T_2$ supplied to an input terminal 247. Sum data appears at an output terminal 248. FIG. 18 shows the relationship among the timing pulse G at the input terminal 239, the four data $D_2$ (FIG. 2C) at the input terminal 238, the sum S at the input terminal 243, the four data $D_1$ (FIG. 2B) at the input terminal 246, the timing pulse $T_1$ at the input terminal 235 and the timing pulse $T_2$ at the input terminal 247.

The preference circuit 228 is the same as that shown in FIG. 6, the rearrangement circuit 229 is the same as that shown in FIG. 7, and the error correction calculation circuit 226 is the same as that shown in FIG. 15.

As is apparent from the third embodiment described above, pseudo halftone images free of degradation can be obtained and can be read by an image reader. For example, in the conventional fascimile system, a circuit is added to the transmission side to obtain the effect of the present invention. Conventionally, in an image consisting of a two-valued or binary image portion and a halftone image portion, one of the image portions is degraded. However, according to the present invention, neither image portion is degraded in image display and recording. The conventional dither method has a limited number of pseudo halftone levels in accordance with the matrix size, and has a low resolution when the size of the scanning window is increased. As a result, the conventional dither method is not practical in color image processing because the number of reproducible color shades is decreased. However, according to this embodiment of the present invention, the reproducible levels are substantially continuous, thereby providing optimum color image processing. Furthermore, in color image processing, the additional data level distributions can be misaligned with respect to the yellow (Y), cyan (C), magenta (M) and black (B) signals, thereby preventing misregistration of the color components. In addition to this advantage, the regularity of the additional data improves the bandwidth compression efficiency of a predictive coding scheme or the like, resulting in a variety of applications.

What is claimed is:

1. A method for processing an image signal, comprising:

a first step of storing in image signal memory means image signal levels of picture elements which are obtained by scanning an original image in a divided manner;

a second step of producing data obtained by adding to the image signal levels additional data which imparts regularity to image signals to be displayed;

a third step of obtaining a sum S of the image signal levels of all the picture elements within a scanning window which has a size corresponding to M picture elements and which scans said image signal memory means, and obtaining values of N and A which satisfy an equation $S = C \times N + A$ for $0 \leq A < C$ where C is a predetermined image signal level, N is an integer, and A is a remainder;

a fourth step of numbering the image signal levels in accordance with one of ascending and descending orders so as to assign an order of preference to all the picture elements within the scanning window in accordance with sum data obtained in the third step;

a fifth step of assigning C as an image signal level to N picture elements in one of the ascending and descending orders, A as an image signal level to a next picture element, and 0 as an image signal level to remaining picture elements; and a sixth step of moving the scanning window by a predetermined number of picture elements so as to correspond to memory locations of said image signal memory means.

2. A method according to claim 1, wherein said image signal memory means includes first and second memory means and the second step includes substeps of adding the additional data to image signal levels of the picture elements obtained by scanning the original image in a divided manner, and of storing sum data obtained in the above substep in said second memory means of said image signal memory means.

3. A method according to claim 1, wherein said image signal memory means includes first and second memory means and the second step includes substeps of storing in said second memory means of said image signal memory means image signals of the picture elements which are obtained by scanning the original image in a divided manner, said second memory means being arranged to have memory areas respectively corresponding to areas of first memory means, and of reading out the image signal from a scanning window position corresponding to that of said first memory means and adding the additional data to the readout image signal.

4. A method according to claim 1, wherein the second step further has a substep of correcting the additional data in accordance with the sum S.

5. A method for processing an image signal, comprising the steps of:
    storing in first and second image signal memory means image signal levels of picture elements which are obtained by scanning an original image in a divided manner;
    calculating a sum S of error correction data E and a sum $S_m$ of the image signal levels of all picture elements within a first scanning window which has a size corresponding to M picture elements and which scans said first image signal memory means, and obtaining N and A from equations given below:

$S = C \times N + A$ for $0 \leq S \leq C \times M$ $N = 0, A = 0$ for $0 > S$ $N = M, A = 0$ for $S > C \times M$ where C is a predetermined image signal level, N is an integer falling in a range $0 \leq N \leq M$, and A is an image signal level falling in a range $0 \leq A < C$;
    superposing values adjusted according to sums on all picture elements within a second scanning window which has a size corresponding to M picture elements, and numbering the superposed picture elements in accordance with one of descending and ascending orders of the image signal levels, the sums being obtained by adding parts of the image signal levels of all the picture elements within the first scanning window to additional data, and the second scanning window being used to scan memory positions of said second image signal memory means which correspond to those of said first image signal memory means;
    assigning C as an image signal level to N picture elements in accordance with one of the ascending and descending orders given by said numbering, A as an image signal level to a next picture element, and 0 as an image signal level to remaining picture elements;
    comparing an image signal level $P_{1ST}$ with a predetermined quantizing level V for $0 \leq V < C$, and assigning C to the image signal level $P_{1ST}$ when the image signal level $P_{1ST}$ is greater than the quantizing level V and assigning 0 to the image signal level $P_{1ST}$ when the image signal level $P_{1ST}$ is smaller than the quantizing level V, an assigned level being defined as an image signal level $P_{2ND}$, and the image signal level $P_{1ST}$ being defined as a picture element which will not appear within the first scanning window again upon movement of the first scanning window along a main scanning direction;
    giving, as the error correction data E after main scanning, a sum of differences between image signal levels $P_{1ST}$ and $P_{2ND}$; and
    moving the first and second scanning windows by predetermined numbers of picture elements over the entire areas of said first and second image signal memory means, respectively.

6. A method for processing an image signal, comprising:
    a first step of storing in first and second image signal memory means image signal levels of picture elements which are obtained by scanning an original image in a divided manner;
    a second step of calculating a sum S of error correction data E and a sum $S_m$ of the image signal levels of all picture elements within a first scanning window which has a size corresponding to M picture elements and which scans said first image signal memory means, and obtaining N and A from equations given below:

$S = C \times N + A$ for $0 \leq S \leq C \times M$ $N = 0, A = 0$ for $0 > S$ $N = M, A = 0$ for $S > C \times M$ where C is a predetermined image signal level, N is an integer falling in a range $0 \leq N \leq M$, and A is an image signal level falling in a range $0 \leq A < C$;
    a third step of superposing values adjusted according to sums on all picture elements within a second scanning window which has a size corresponding to M picture elements, and numbering the superposed picture elements in accordance with one of descending and ascending orders of the image signal levels, the sums being obtained by adding parts of the image signal levels of all the picture elements within the first scanning window to additional data, and the second scanning window being used to scan memory positions of said second image signal memory means which correspond to those of said first image signal memory means;
    a fourth step of assigning C as an image signal level to N picture elements within the first scanning window in accordance with one of the ascending and descending orders of the image signal levels, A as an image signal level to a next picture element, and 0 as an image signal level to remaining picture elements;
    a fifth step of comparing an image signal level $P_{1ST}$ with a predetermined quantizing level V for $0 \leq V < C$, and for assigning C to the image signal level $P_{1ST}$ when the image signal level $P_{1ST}$ is greater than the quantizing level V and assigning 0 to the image signal level $P_{1ST}$ when the image signal level $P_{1ST}$ is smaller than the quantizing level V, an assigned level being defined as an image signal level $P_{2ND}$, and the image signal level $P_{1ST}$ being defined as a picture element which will not appear within the first scanning window again upon movement of the first scanning window along a main scanning direction;

a sixth step of giving, as the error correction data E after main scanning, a sum of differences between image signal levels $P_{1ST}$ and $P_{2ND}$; and a seventh step of repeating the first to sixth steps by moving the first and second scanning windows by predetermined numbers of picture elements over the entire areas of said first and second image signal memory means, respectively.

7. A method according to claim 6, wherein the third step comprises a substep of adding a value obtained by controlling an addition result of part of the image signal levels of the picture elements within the first scanning window and the additional data in accordance with a sum S, and a substep of rearranging the picture elements in accordance with one of the ascending and descending orders of the image signal levels.

8. A method according to claim 6, wherein the third step comprises a substep of superposing on each picture element a value obtained by controlling an addition result of part of the image signal levels of the picture elements within the first scanning window and the additional data in accordance with a sum of all image signal levels within the second scanning window, and a substep of rearranging the picture elements in accordance with one of the ascending and descending orders of the image signal levels.

9. An apparatus for processing an image signal, comprising:

first image signal memory means for storing image signal levels of picture elements which are obtained by scanning an original image in a divided manner;

additional data adding means for adding addition data to the image signal levels of the picture elements;

second image signal memory means for storing data for producing data for assigning an order of preference to all picture elements within a scanning window;

data adding means for obtaining a sum S of all picture elements within a first scanning window which has a size corresponding to M picture elements so as to scan said first image signal memory means;

means for obtaining values of N and A which satisfy an equation $S = C \times N + A$ where C is a predetermined image signal level, N is an integer and A is an image signal level which satisfies $0 \leq A < C$;

preference circuit means for numbering all picture elements within a second scanning window which has a size corresponding to M picture elements so as to scan said second image signal memory means, in accordance with one of ascending and descending orders of the image signal levels;

rearrangement circuit means for assigning C as an image signal level to N picture elements of the picture elements ordered by said preference circuit, A as an image signal level to a next picture element, and 0 as an image signal level to remaining picture elements; and means for moving the first and second scanning windows by predetermined numbers of picture elements over entire areas of said first and second image signal memory means, respectively.

10. An apparatus for processing an image signal, comprising:

first and second image signal memory means for storing image signal levels of picture elements which are obtained by scanning an original image in a divided manner;

calculating means for calculating a sum S of error correction data E and a sum $S_m$ of the image signal levels of all picture elements within a first scanning window which has a size corresponding to M picture elements and which scans said first image signal memory means, and obtaining N and A from equations given below:

$S = C \times N + A$ for $0 \leq S \leq C \times M$ $N = 0, A = 0$ for $0 > S$ $N = M, A = 0$ for $S > C \times M$ where C is a predetermined image signal level, N is an integer falling in a range $0 \leq N \leq M$, and A is an image signal level falling in a range $0 \leq A < C$;

preference circuit means for superposing additional data adjusted in accordance with the sum S with respect to sums on all picture elements within a second scanning window which has a size corresponding to M picture elements, and numbering the superposed picture elements in accordance with one of descending and ascending orders of the image signal levels, the sums being obtained by adding parts of the image signal levels of all the picture elements within the first scanning window to additional data, and the second scanning window being used to scan memory positions of said second image signal memory means which correspond to those of said first image signal memory means;

means for assigning C as an image signal level to N picture elements in accordance with one of the ascending and descending orders given by said preference circuit means, A as an image signal level to a next picture element, and 0 as an image signal level to remaining picture elements;

means for comparing an image signal level $P_{1ST}$ with a predetermined quantizing level V for $0 \leq V < C$, and for assigning C to the image signal level $P_{1ST}$ when the image signal level $P_{1ST}$ is greater than the quantizing level V and assigning 0 to the image signal level $P_{1ST}$ when the image signal level $P_{1ST}$ is smaller than the quantizing level V, an assigned level being defined as an image signal level $P_{2ND}$, and the image signal level $P_{1ST}$ being defined as a picture element which will not appear within the first scanning window again upon movement of the first scanning window along a main scanning direction;

means for giving, as the error correction data E after main scanning, a sum of differences between image signal levels $P_{1ST}$ and $P_{2ND}$; and means for moving the first and second scanning windows by predetermined numbers of picture elements over the entire areas of said first and second image signal memory means, respectively.

11. An apparatus for processing an image signal, comprising:

first and second image signal memory means for storing image signal levels of picture elements which are obtained by scanning an original image in a divided manner;

means for calculating a sum S of error correction data E and a sum $S_m$ of the image signal levels of all picture elements within a first scanning window which has a size corresponding to M picture elements and which scans said first image signal memory means, and obtaining N and A from equations given below:

$S = C \times N + A$ for $0 \leq S \leq C \times M$ $N = 0, A = 0$ for $0 > S$ $N = M, A = 0$ for $S > C \times M$ where C is a predetermined image signal level, N is an integer falling in a range $0 \leq N \leq M$, and A is an image signal level falling in a range $0 \leq A < C$;

preference circuit means for superposing values adjusted according to sums on all picture elements within a second scanning window which has a size corresponding to M picture elements, and numbering the superposed picture elements in accordance with one of descending and ascending orders of the image signal levels, the sums being obtained by adding parts of the image signal levels of all the picture elements within the first scanning window to additional data, and the second scanning window being used to scan memory positions of said second image signal memory means which correspond to those of said first image signal memory means;

means for assigning C as an image signal level to N picture elements in accordance with one of the ascending and descending orders given by said preference circuit means, A as an image signal level to a next picture element, and 0 as an image signal level to remaining picture elements;

means for comparing an image signal level $P_{1ST}$ with a predetermined quantizing level V for $0 \leq V < C$, and for assigning C to the image signal level $P_{1ST}$ when the image signal level $P_{1ST}$ is greater than the quantizing level V and assigning 0 to the image signal level $P_{1ST}$ when the image signal level $P_{1ST}$ is smaller than the quantizing level V, an assigned level being defined as an image signal level $P_{2ND}$, and the image signal level $P_{1ST}$ being defined as a picture element which will not appear within the first scanning window again upon movement of the first scanning window along a main scanning direction;

means for giving, as the error correction data E after main scanning, a sum of differences between image signal levels $P_{1ST}$ and $P_{2ND}$; and means for moving the first and second scanning windows by predetermined numbers of picture elements over the entire areas of said first and second image signal memory means, respectively.

12. An apparatus according to claim 10, wherein said preference circuit means adds a value obtained by controlling an addition result of part of the image signal levels of the picture elements within the second scanning window and the additional data in accordance with a sum S, and rearranges the picture elements in accordance with one of the ascending and descending orders of the image signal levels.

13. An apparatus according to claim 10, wherein said preference circuit means superposes on each picture element a value obtained by controlling an addition result of part of the image signal levels of the picture elements and the additional data in accordance with a sum of all image signal levels within the second scanning window, and rearranges the picture elements in accordance with one of the ascending and descending orders of the image signal levels.

* * * * *